(12) United States Patent
Yoshioka

(10) Patent No.: US 9,240,935 B2
(45) Date of Patent: Jan. 19, 2016

(54) COMMUNICATION SYSTEM

(75) Inventor: Daisuke Yoshioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 960 days.

(21) Appl. No.: 13/326,206

(22) Filed: Dec. 14, 2011

(65) Prior Publication Data

US 2012/0155286 A1 Jun. 21, 2012

(30) Foreign Application Priority Data

Dec. 16, 2010 (JP) ................................. 2010-280746

(51) Int. Cl.
| | |
|---|---|
| *H04L 12/26* | (2006.01) |
| *H04L 12/22* | (2006.01) |
| *H04L 1/20* | (2006.01) |
| *H04L 1/22* | (2006.01) |

(52) U.S. Cl.
CPC ............ *H04L 43/0829* (2013.01); *H04L 1/203* (2013.01); *H04L 1/22* (2013.01)

(58) Field of Classification Search
USPC ........................................................ 370/242
See application file for complete search history.

(56) References Cited

U.S. PATENT DOCUMENTS

| | | | | |
|---|---|---|---|---|
| 6,798,742 | B1 * | 9/2004 | Mawhinney et al. ......... | 370/230 |
| 2002/0154639 | A1 * | 10/2002 | Calvert .................. | H04L 45/00 370/389 |
| 2002/0174216 | A1 * | 11/2002 | Shorey ................ | H04L 12/2602 709/224 |
| 2007/0064596 | A1 * | 3/2007 | Jung ............................. | 370/229 |
| 2007/0177626 | A1 * | 8/2007 | Kotelba ....................... | 370/252 |
| 2008/0151881 | A1 * | 6/2008 | Liu et al. ..................... | 370/389 |
| 2009/0052332 | A1 * | 2/2009 | Fukuyama et al. ........... | 370/242 |
| 2009/0116402 | A1 * | 5/2009 | Yamasaki ..................... | 370/253 |
| 2009/0310493 | A1 * | 12/2009 | Nogami ........................ | 370/252 |
| 2010/0097924 | A1 * | 4/2010 | Yamaguchi et al. .......... | 370/216 |
| 2010/0150010 | A1 * | 6/2010 | Wakuda ........................ | 370/252 |

(Continued)

FOREIGN PATENT DOCUMENTS

| | | |
|---|---|---|
| JP | 2006-229477 A | 8/2006 |
| JP | 2008-131615 A | 6/2008 |
| JP | 2008-244870 A | 10/2008 |
| JP | 2010-028654 A | 2/2010 |
| WO | WO 2010/125883 A1 | 11/2010 |

OTHER PUBLICATIONS

ITU-T Recommendation Y.1731 (Feb. 2008).

(Continued)

*Primary Examiner* — Jenee Williams
(74) *Attorney, Agent, or Firm* — McGinn IP Law Group, PLLC.

(57) ABSTRACT

A disclosed technology can accurately measures the data frame loss between a pair of communication devices even when link aggregation is present between the communication devices. A communication system includes a transmitting device, receiving device, a plurality of transmitting and receiving links, and a measuring device. The transmitting device duplicates for the same number of times as the number of transmitting and receiving links a data frame loss measurement frame in which the total number of transmitted data frames is written, and then transmits them to the transmitting and receiving links. The receiving device writes the total number of received data frames in the received data frame loss measurement frame. The measuring device measures the data frame loss between the transmitting and receiving devices by subtracting the total number of data frames received by the receiving device from the total number of data frames transmitted by the transmitting device.

17 Claims, 18 Drawing Sheets

(56) References Cited

U.S. PATENT DOCUMENTS

2010/0166010 A1* 7/2010 Ukita et al. .................. 370/465
2010/0177646 A1* 7/2010 Kobayashi .................. 370/252
2011/0199929 A1* 8/2011 Guo et al. .................... 370/252

OTHER PUBLICATIONS

Japanese Office Action dated May 27, 2014 with an English translation thereof.

* cited by examiner

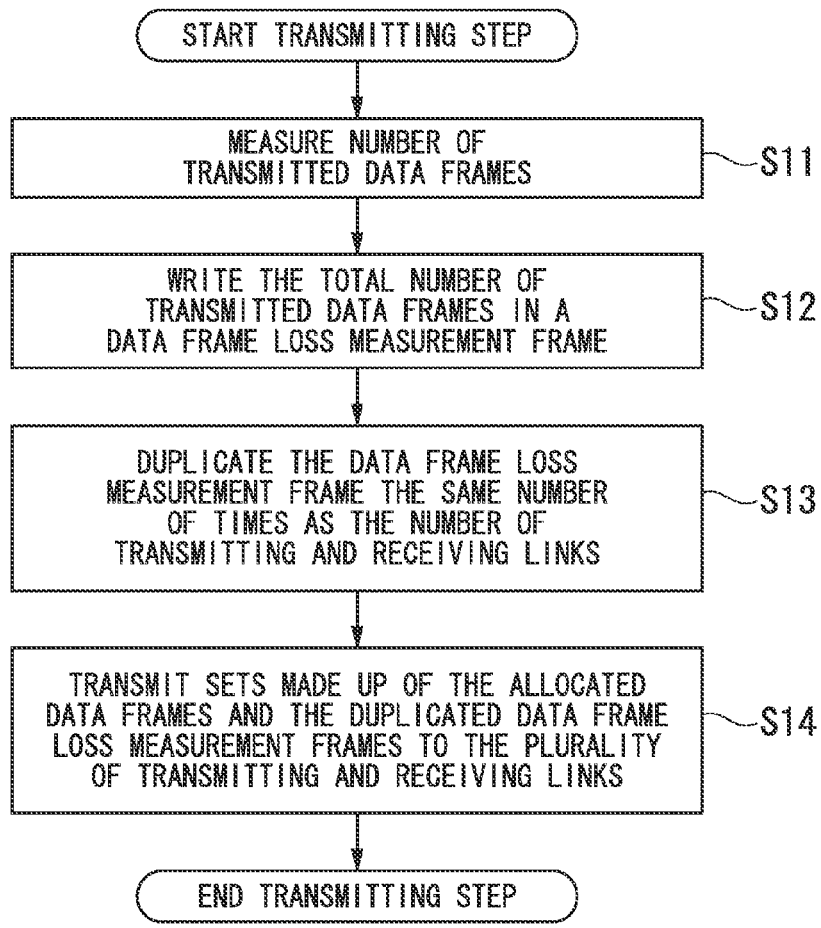

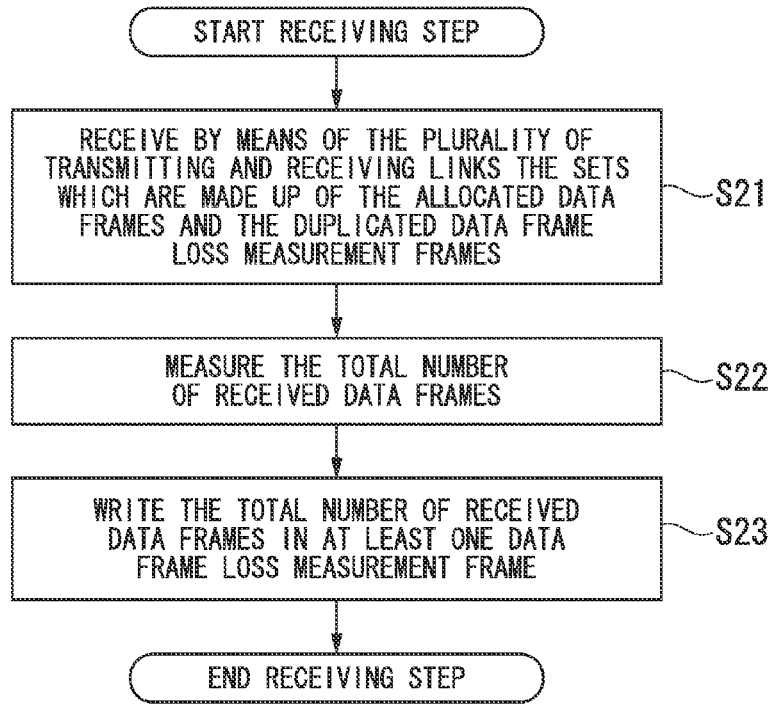
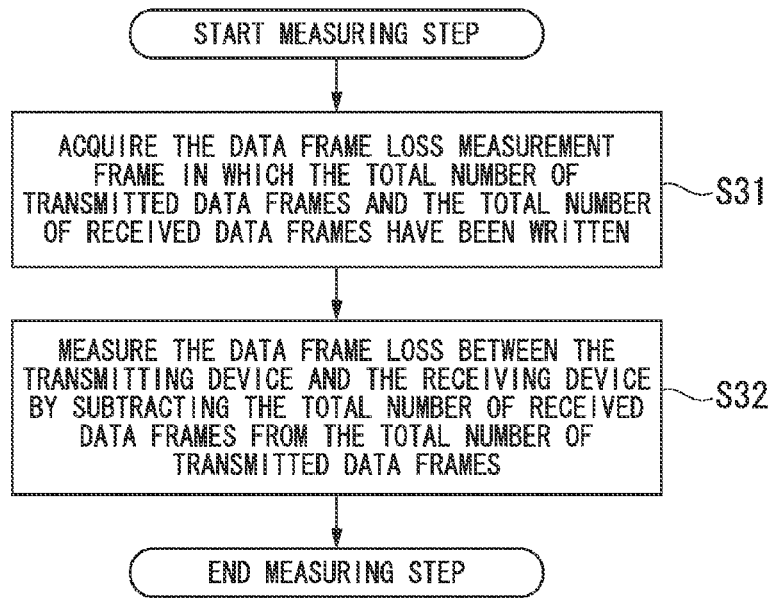

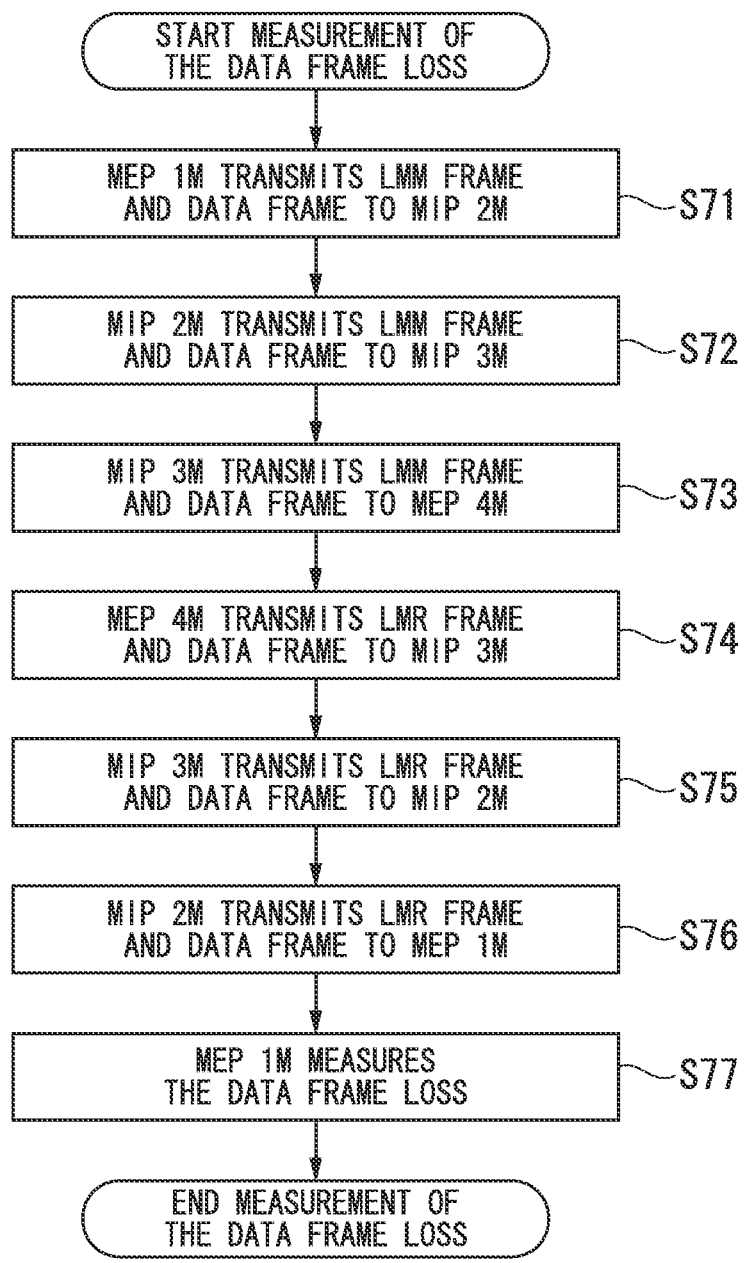

FIG. 20A

| MEG level | Version | Opcode=43 | Flag | TLV offset |
|---|---|---|---|---|
| TxFCf ||||||
| Reserved for RxFCf in LMR ||||||
| Reserved for TxFCb in LMR ||||||
| End TLV (0) | | | | |
| MIP-ID | TxFCf_mip2M ||||
| MIP-ID | TxFCf_mip3M ||||
| Reserved for MIP-ID | Reserved for TxFCb_mip2M in LMR ||||
| Reserved for MIP-ID | Reserved for TxFCb_mip3M in LMR ||||

FIG. 20B

| MEG level | Version | Opcode=42 | Flag | TLV offset |
|---|---|---|---|---|
| TxFCf |||||
| RxFCf |||||
| TxFCb |||||
| End TLV (0) | | | | |
| MIP-ID | TxFCf_mip2M ||||
| MIP-ID | TxFCf_mip3M ||||
| MIP-ID | TxFCb_mip2M ||||
| MIP-ID | TxFCb_mip3M ||||

COMMUNICATION SYSTEM

INCORPORATION BY REFERENCE

Priority is claimed on Japanese Patent Application No. 2010-280746 filed Dec. 16, 2010, the content of which is incorporated herein by reference.

BACKGROUND OF THE INVENTION

1. Field of the Invention

The present invention relates to a technology that, without the sequence of data frames and data frame loss measurement frames being switched from a normal sequence to an incorrect sequence, accurately measures data frame loss between transmitting and receiving devices that have a plurality of transmitting and receiving links.

2. Description of Related Art

A technology is known that measures data frame loss using Ethernet (registered trademark) OAM (Operation Administration and Maintenance) or MPLS-TP (Multi-Protocol Label Switching-Transport Profile).

A technology that measures data frame loss between a pair of communication devices is disclosed in ITU-T Recommendation Y.1731. The pair of communication devices are MEP (Maintenance Entity Group End Point) devices. The MEP on the transmitting side measures the number of transmitted data frames, and writes this number in a data frame loss measurement frame. The MEP on the receiving side measures the number of received data frames and writes this number in the data frame loss measurement frame. By then subtracting the number of received data frames from the number of transmitted data frames, the data frame loss between the MEP on the transmitting side and the MEP on the receiving side is measured. However, when a relay device is installed between the pair of communication devices, then, when viewed from this relay device, it is not possible to determine whether the data frame loss occurred on the transmitting side or on the receiving side.

In Japanese Unexamined Patent Application, First Publication, (JP-A) No. 2008-244870, a technology is disclosed that, when a relay device is installed between a pair of communication devices, determines whether a data frame loss has occurred on the transmitting side or on the receiving side as viewed from this relay device. The relay device is an MIP (Maintenance Entity Group Intermediate Point) device. The MEP on the transmitting side measures the number of data frames being transmitted and writes this number in a data frame loss measurement frame. The MIP measures the number of received data frames and, in addition to writing this number in the data frame loss measurement frame, measures the number of data frames being transmitted and writes this number in the data frame loss measurement frame. The MEP on the receiving side measures the number of received data frames and writes this number in the data frame loss measurement frame. By then subtracting the number of data frames received by the MIP from the number of data frames transmitted by the MEP on the transmitting side, the data frame loss between the MEP on the transmitting side and the MIP is measured. Furthermore, by subtracting the number of data frames received by the MEP on the receiving side from the number of data frames transmitted by the MIP, the data frame loss between the MEP and the MEP on the receiving side is measured. However, no consideration is given to the existence of link aggregation between the MEP on the transmitting side and the MIP, and neither is any consideration given to the existence of link aggregation between the MIP and the MEP on the receiving side.

In Japanese Unexamined Patent Application, First Publication (JP-A) No. 2008-131615, consideration is given to the existence of link aggregation between the pair of communication devices. In addition, by transferring an OAM frame in all of the links from the MEP on the transmitting side to the MEP on the receiving side, it is possible to detect which of the links between the MEP on the transmitting side and the MEP on the receiving side an obstruction has occurred in. However, no consideration is given to measuring the data frame loss between the MEP on the transmitting side and the MEP on the receiving side.

SUMMARY OF THE INVENTION

Therefore, in order to solve the above described problems, it is an object of the present invention to provide a technology that accurately measures data frame loss between a pair of communication devices even when link aggregation exists between the pair of communication devices.

In order to achieve the above described object, the communication system of the present invention includes: a transmitting device that measures a number of data frames to be transmitted, and then allocates the data frames to be transmitted to a plurality of transmitting links, and then writes the total number of data frames to be transmitted in a data frame loss measurement frame, and then duplicates the written data frame loss measurement frame the same number of times as the number of the plurality of transmitting links, and then transmits sets which are made up of the allocated data frames and the duplicated data frame loss measurement frames to each of the plurality of transmitting links; a receiving device that receives by means of a plurality of receiving links which correspond to each of the plurality of transmitting links the sets which are made up of the allocated data frames and the duplicated data frame loss measurement frames, and then measures the total number of received data frames, and then writes the total number of received data frames at least one of the received data frame loss measurement frames; and a measuring device that acquires the data frame loss measurement frame in which the total number of data frames transmitted by the transmitting device and the total number of data frames received by the receiving device have been written, and then measures the data frame loss between the transmitting device and the receiving device by subtracting the total number of data frames received by the receiving device from the total number of data frames transmitted by the transmitting device.

In order to achieve the above described object, the transmitting device of the present invention includes: a transmitted data frame number measuring section that measures the number of transmitted data frames; a transmitted data frame allocating section that allocates the transmitted data frames to a plurality of transmitting links; a data frame loss measurement frame writing section that writes the total number of transmitted data frames in a data frame loss measurement frame; a data frame loss measurement frame duplicating section that duplicates the written data frame loss measurement frame the same number of times as the number of the plurality of transmitting links; and a frame transmitting section that transmits sets which are made up of the allocated data frames and the duplicated data frame loss measurement frames to each of the plurality of transmitting links.

In order to achieve the above described object, the receiving device of the present invention includes: a frame receiving section that receives by means of each one of the plurality of receiving links sets which are made up of data frames which are allocated to a plurality of receiving links, and of data frame loss measurement frames which are duplicated the same number of times as the number of the plurality of receiving links; a received data frame number measuring section that measures the total number of received data frames; and a data frame loss measurement frame writing section that writes the total number of the received data frames in at least one of the received data frame loss measurement frames.

In order to achieve the above described object, the measuring device of an aspect of the present invention includes: a data frame loss measurement frame acquiring section that acquires data frame loss measurement frames in which is written the total number of data frames that are transmitted by a transmitting device that firstly measures the number of data frames to be transmitted, and then allocates the data frames to be transmitted to a plurality of transmitting links, and then writes the total number of data frames to be transmitted in a data frame loss measurement frame, and then duplicates the written data frame loss measurement frame the same number of times as the number of the plurality of transmitting links, and then transmits sets which are made up of the allocated data frames and the duplicated data frame loss measurement frames to each of the plurality of transmitting links, and in which data frame loss measurement frames is also written the total number of data frames received by a receiving device that receives by means of a plurality of receiving links which correspond to each of the plurality of transmitting links the sets which are made up of the allocated data frames and the duplicated data frame loss measurement frames, and then measures the total number of received data frames, and then writes the total number of received data frames in at least one of the received data frame loss measurement frames; and a data frame loss measuring section that measures the data frame loss between the transmitting device and the receiving device by subtracting the total number of data frames received by the receiving device from the total number of data frames transmitted by the transmitting device.

In order to achieve the above described object, the data frame loss measuring method of an aspect of the present invention includes in the following sequence: a transmitting step in which a number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links; a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a measuring step in which the data frame loss measurement frame in which the total number of transmitted data frames and the total number of received data frames have been written is acquired, and the data frame loss between the transmission and the reception is then measured by subtracting the total number of received data frames from the total number of transmitted data frames.

In order to achieve the above described object, the transmitting method of an aspect of the present invention includes in the following sequence: a transmitted data frame number measuring step in which the number of transmitted data frames is measured; a data frame loss measurement frame writing step in which the total number of transmitted data frames is written in a data frame loss measurement frame; a data frame loss measurement frame duplicating step in which the written data frame loss measurement frame is duplicated the same number of times as the number of the plurality of transmitting links; and a frame transmitting step in which sets which are made up of the allocated data frames and the duplicated data frame loss measurement frames are transmitted to each of the plurality of transmitting links.

In order to achieve the above described object, the receiving method of an aspect of the present invention includes in the following sequence: a frame receiving step in which sets which are made up of data frames which are allocated to a plurality of receiving links, and of data frame loss measurement frames which are duplicated the same number of times as the number of the plurality of receiving links are received by each one of the plurality of receiving links; a received data frame number measuring step in which the total number of the received data frames is measured; and a data frame loss measurement frame writing step in which the total number of the received data frames is written in at least one of the received data frame loss measurement frames.

In order to achieve the above described object, the measuring method of an aspect of the present invention includes in the following sequence: a data frame loss measurement frame acquiring step in which are acquired data frame loss measurement frames in which is written the total number of data frames that are transmitted in a transmitting step in which the number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links, and in which is also written the total number of data frames received in a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a data frame loss measuring step in which the data frame loss between the transmitting device and the receiving device is measured by subtracting the total number of data frames received by the receiving device from the total number of data frames transmitted by the transmitting device.

In order to achieve the above described object, a computer-readable recording medium which stores a data frame loss measuring program of an aspect of the present invention causes a communication system to execute in the following sequence: a transmitting step in which a number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links; a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a measuring step in which a data frame loss measurement frame in which the total number of transmitted data frames and the total number of received data frames have been written is acquired, and the data frame loss between the transmission and the reception is then measured by subtracting the total number of received data frames from the total number of transmitted data frames.

In order to achieve the above described object, a computer-readable recording medium which stores a transmitting program of an aspect of the present invention causes a transmitting device to execute in the following sequence: a transmitted data frame number measuring step in which the number of transmitted data frames is measured; a data frame loss measurement frame writing step in which the total number of transmitted data frames is written in a data frame loss measurement frame; a data frame loss measurement frame duplicating step in which the written data frame loss measurement frame is duplicated the same number of times as the number of the plurality of transmitting links; and a frame transmitting step in which sets which are made up of the allocated data frames and the duplicated data frame loss measurement frames are transmitted to each of the plurality of transmitting links.

In order to achieve the above described object, a computer-readable recording medium which stores a receiving program of an aspect of the present invention causes a receiving device to execute in the following sequence: a frame receiving step in which sets which are made up of data frames which are allocated to a plurality of receiving links, and of data frame loss measurement frames which are duplicated the same number of times as the number of the plurality of receiving links are received by each one of the plurality of receiving links; a received data frame number measuring step in which the total number of the received data frames is measured; and a data frame loss measurement frame writing step in which the total number of the received data frames is written in at least one of the received data frame loss measurement frames.

In order to achieve the above described object, a computer-readable recording medium which stores a measuring program of an aspect of the present invention causes a measuring device to execute in the following sequence: a data frame loss measurement frame acquiring step in which are acquired data frame loss measurement frames in which is written the total number of data frames that are transmitted in a transmitting step in which the number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links, and in which data frame loss measurement frames is also written the total number of data frames received in a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a data frame loss measuring step in which the data frame loss between the transmitting device and the receiving device is measured by subtracting the total number of data frames received by the receiving device from the total number of data frames transmitted by the transmitting device.

The present invention makes it possible to provide a technology that accurately measures data frame loss between a pair of communication devices even when link aggregation exists between the pair of communication devices.

BRIEF DESCRIPTION OF THE DRAWINGS

FIG. 5 is a view showing the contents of a transmitting step according to Embodiment 1.

FIG. 6 is a view showing the contents of a receiving step according to Embodiment 1.

FIG. 7 is a view showing the contents of a measuring step according to Embodiment 1.

FIG. 19 is a view showing a data frame loss measuring method according to Embodiment 4.

FIGS. 20A and 20B are tables showing an L frame and an LMR frame, respectively, according to Embodiment 4.

DETAILED DESCRIPTION OF EMBODIMENTS

Figure 1:
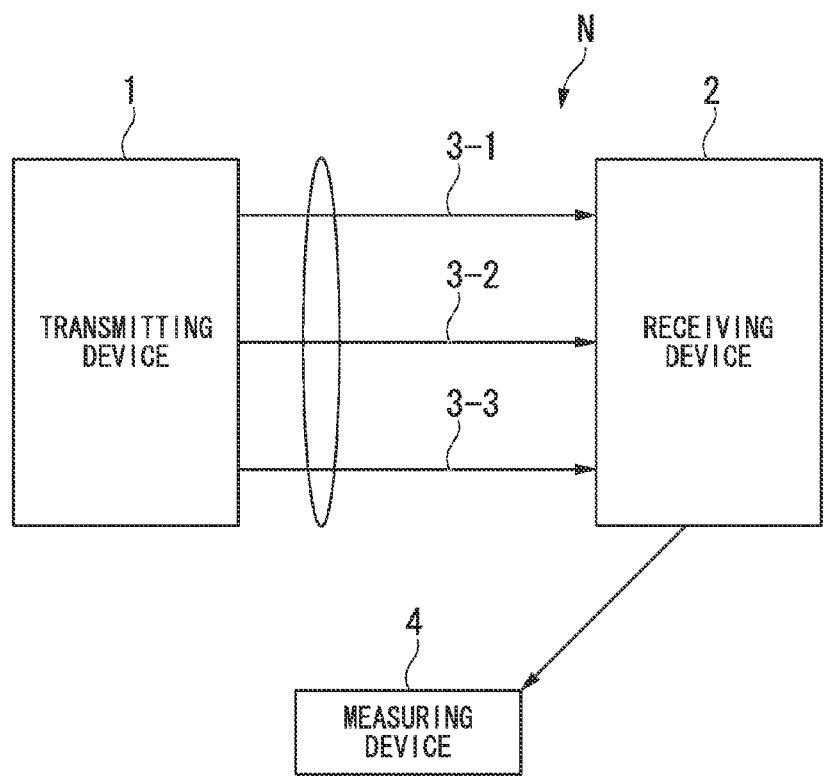
FIG. 1 is a view showing the structure of a communication system according to Embodiment 1.

Embodiments of the present invention will now be described with reference made to the attached drawings. The embodiments described below serve as examples of embodiments of the present invention, and the present invention is in no way limited to these embodiments. Note that component elements which have the same descriptive symbols in both the specification and in the drawings are to be taken as the same that component elements.

(Embodiment 1)

The structure of a communication system according to Embodiment 1 is shown in FIG. 1. A communication system N is provided with a transmitting device 1, a receiving device 2, a plurality of transmitting and receiving links 3-1, 3-2, 3-3, and a measuring device 4. The transmitting device 1 and the receiving device 2 will be described below. The plurality of transmitting and receiving links 3-1, 3-2, and 3-3 connect together the transmitting device 1 and the receiving device 2 and make up a link aggregation. The measurement device 4 measures data frame loss between the transmitting device 1 and the receiving device 2. By installing in the communication system N a data frame loss measuring program which causes the steps described below to be executed, the data frame loss measuring method described below can be executed.

Figure 2:
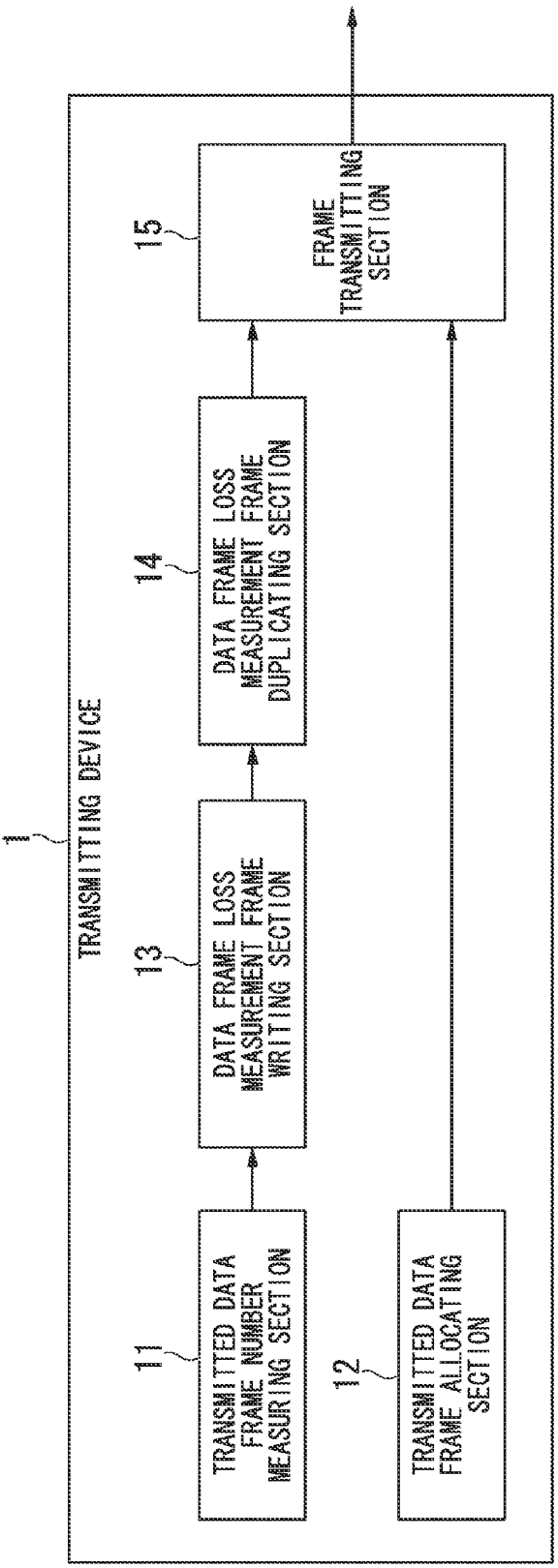
FIG. 2 is a view showing the structure of a transmitting device according to Embodiment 1.

The structure of the transmitting device of Embodiment 1 is shown in FIG. 2. The transmitting device 1 is provided with a transmitted data frame number measuring section 11, a transmitted data frame allocating section 12, a data frame loss measurement frame writing section 13, a data frame loss measurement frame duplicating section 14, and a frame transmitting section 15. By installing in the transmitting device 1 a transmitting program which causes the steps described below to be executed, the transmitting method described below can be executed.

The transmitted data frame number measuring section 11 measures the number of data frames transmitted to the receiving device 2. The transmitted data frame allocating section 12 allocates data frames that are transmitted to the receiving device 2 to the plurality of transmitting and receiving links 3-1, 3-2, and 3-3. The data frame loss measurement frame writing section 13 writes the total number of data frames transmitted to the receiving device 2 in a data frame loss measurement frame. The data frame loss measurement frame duplicating section 14 duplicates the data frame loss measurement frames that were written using the data frame loss measurement frame writing section 13 the same number of times as the number of the plurality of transmitting and receiving links 3-1, 3-2, and 3-3. The frame transmitting section 15 transmits to each of the plurality of transmitting and receiving links 3-3-2, and 3-3 sets which are made up of the data frames which were allocated using the transmitting data frame allocating section 12 and the data frame loss measurement frames that were duplicated using the data frame loss measurement frame duplicating section 14. Accordingly, after the transmitting device 1 has ascertained that a data frame belongs to a set which is made up of that particular data frame and data frame loss measurement frame, it is able to write the total number of data frames transmitted to the receiving device 2 in the data frame loss measurement frame.

Figure 3:
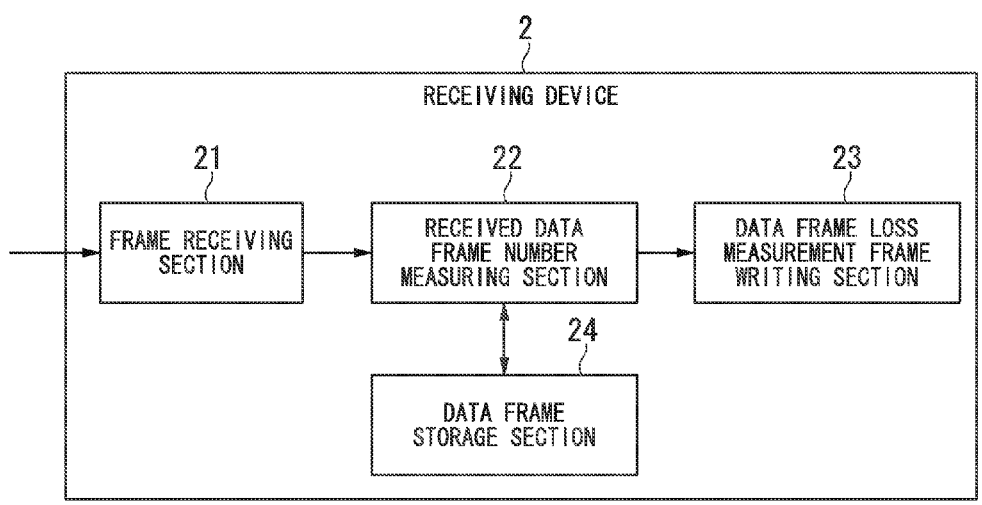
FIG. 3 is a view showing the structure of a receiving device according to Embodiment 1.

The structure of the receiving device of Embodiment 1 is shown in FIG. 3. The receiving device 2 is provided with a frame receiving section 21, a received data frame number measuring section 22, a data frame loss measurement frame writing section 23, and a data frame storage section 24. By installing in the receiving device 2 a receiving program which causes the steps described below to be executed, the receiving method described below can be executed.

The frame receiving section 21 receives from each of the plurality of transmitting and receiving links 3-1, 3-2, and 3-3 the sets that are made up of the data frames which were allocated using the transmitting data frame allocating section 12 and the data frame loss measurement frames that were duplicated using the data frame loss measurement frame duplicating section 14. The received data frame number measuring section 22 measures the total number of data frames which have been received using the frame receiving section 21. The data frame loss measurement frame writing section 23 writes the total number of data frames which have been received using the frame receiving section 21 in at least one of the data frame loss measurement frames which have been received using the frame receiving section 21. The data frame storage section 24 is described below in Embodiment 2. Accordingly, after the receiving device 2 has ascertained which of the sets, which are made up of the relevant data frame and data frame loss measurement frame, a data frame belongs to, it is able to write the total number of data frames received from the transmitting device 1 in the data frame loss measurement frame.

Figure 4:
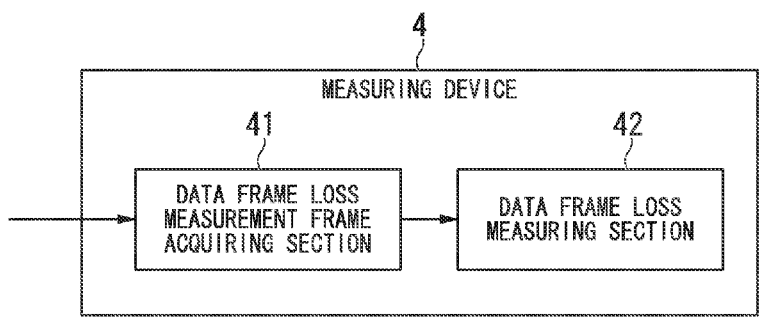
FIG. 4 is a view showing the structure of a measuring device according to Embodiment 1.

The structure of the measuring device of Embodiment 1 is shown in FIG. 4. The measuring device 4 is provided with a data frame loss measurement frame acquiring section 41 and a data frame loss measuring section 42. By installing a measuring program in the measuring device 4 which causes the steps described below to be executed, it is possible to execute the measuring method described below. The measuring device 4 is installed independently from the receiving device 2, however, they may also be installed as an integrated unit.

The data frame loss measurement frame acquiring section 41 acquires data frame loss measurement frames in which the total number of data frames transmitted by the transmitting device 1 and the total number of data frames received by the receiving device 2 have been written. As a result of the data frame loss measuring section 42 subtracting the total number of data frames received by the receiving device 2 from the total number of data frames transmitted by the transmitting device 1, the data frame loss between the transmitting device 1 and the receiving device 2 is measured.

The contents of a transmitting step of Embodiment 1 are shown in FIG. 5. In a transmitted data frame number measuring step, the transmitted data frame number measuring section 11 measures the number of data frames transmitted to the receiving device 2 (step S11). In a data frame loss measurement frame writing step, the data frame loss measurement frame writing section 13 writes the total number of data frames transmitted to the receiving device 2 in the data frame loss measurement frame (step S12). In a data frame loss measurement frame duplicating step, the data frame loss measurement frame duplicating section 14 duplicates the data frame loss measurement frames which were written using the data frame loss measurement frame writing section 13 the same number of times as the number of the plurality of transmitting and receiving links 3-1, and 3-3 (step S13). In a frame transmitting step, the frame transmitting section 15 transmits to each of the plurality of transmitting and receiving links 3-1, 3-2, and 3-3 the data frames which were allocated to the plurality of transmitting and receiving links 3-1, 3-2, and 3-3. In addition, the frame transmitting section 15 transmits to each of the plurality of transmitting and receiving links 3-1, 3-2, and 3-3 the data frame loss measurement frames which were duplicated using the data frame loss measurement frame duplicating section 14 (step S14). Accordingly, after the transmitting device 1 has ascertained that a data frame belongs to a set which is made up of that particular data frame and a data frame loss measurement frame, it is able to write the total number of data frames transmitted to the receiving device 2 in the data frame loss measurement frame.

The contents of a receiving step of Embodiment 1 are shown in FIG. 6. In a frame receiving step, the frame receiving section 21 receives in each of the plurality of transmitting and receiving links 3-1, 3-2, and 3-3 the data frames which have been allocated using the transmission data frame allocating section 12. In addition, the frame receiving section 21 receives in each of the plurality of transmitting and receiving links 3-1, 3-2, and 3-3 the data frame loss measurement frames which were duplicated using the data frame loss measurement frame duplicating section 14 (step S21). In a received data frame number measurement step, the received data frame number measuring section 22 measures the total number of data frames which were received using the frame receiving section 21 (step S22). In a data frame loss measurement frame writing step, the data frame loss measurement frame writing section 23 writes the total number of data frames which were received using the frame receiving section 21 in at least one of the data frame loss measurement frames which were received using the frame receiving section 21 (step S23). Accordingly, after the receiving device 2 has ascertained which of the sets, which are made up of the relevant data frame and data frame loss measurement frame, a data frame belongs to, it is able to write the total number of data frames received from the transmitting device 1 in the data frame loss measurement frame.

The contents of a measuring step of Embodiment 1 are shown in FIG. 7. In a data frame loss measurement frame acquiring step, the data frame loss measurement frame acquiring section 41 acquires the data frame loss measurement frame in which the total number of data frames transmitted by the transmitting device 1 and the total number of data frames received by the receiving device 2 have been written (step S31). In a data frame loss measuring step, the data frame loss measuring section 42 measures the data frame loss between the transmitting device 1 and the receiving device 2 by subtracting the total number of data frames received by the receiving device 2 from the total number of data frames transmitted by the transmitting device 1 (step S32).

(Embodiment 2)

Figure 8:
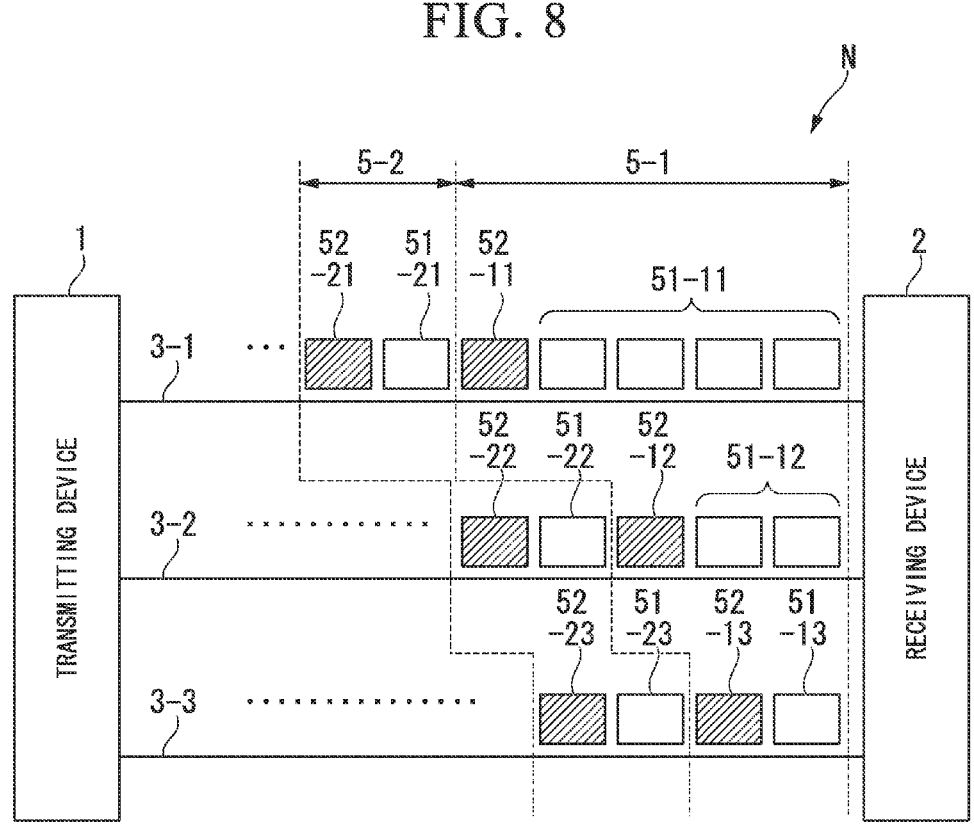
FIG. 8 is a view showing a transmitting and receiving method employed between a transmitting device and a receiving device according to Embodiment 2.
Figure 9:
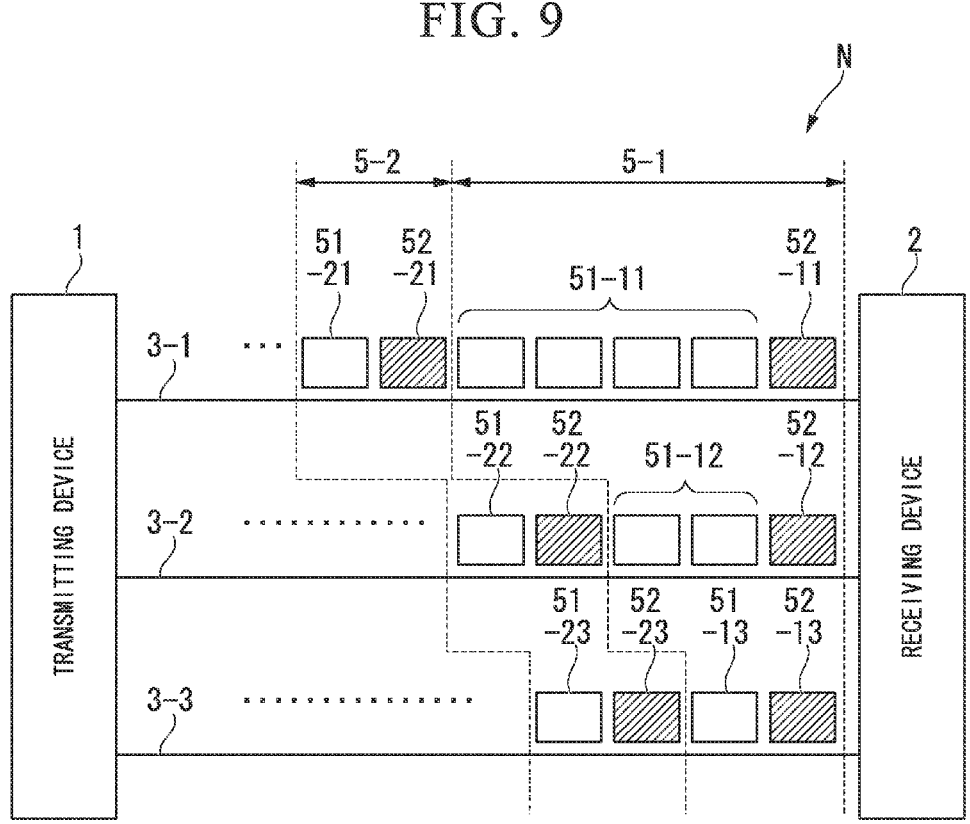
FIG. 9 is a view showing a transmitting and receiving method employed between the transmitting device and the receiving device according to Embodiment 2.

Methods of transmitting and receiving data between the transmitting device and receiving device of Embodiment 2 are shown in FIG. 8 and FIG. 9. The transmitting and receiving sequence of data frames and data frame loss measurement frames in FIG. 8 is different from that in FIG. 9.

Firstly, a method of transmitting and receiving data between the transmitting device 1 and the receiving device 2 of Embodiment 2 which is shown in FIG. 8 will be described. In the transmitting device 1, the frame transmitting section 15 transmits to each of the plurality of transmitting and receiving links 3-1, 3-2, and 3-3 the data frames which were allocated using the transmission data frame allocating section 12 and the data frame loss measurement frames which were duplicated using the data frame loss measurement frame duplicating section 14 in that sequence. In the receiving device 2, the frame receiving section 21 receives in each of the plurality of transmitting and receiving links 3-1, 3-2, and 3-3 the data frames which were allocated using the transmission data frame allocating section 12 and the data frame loss measurement frames which were duplicated using the data frame loss measurement frame duplicating section 14 in that sequence.

Specifically, frame sets 5 pass through each of the plurality of transmitting and receiving links 3-1, 3-2, and 3-3 in the sequence of a first frame set 5-1 first and then a second frame set 5-2. Firstly, the transmitted data frame allocating section 12 and the data frame loss measurement frame duplicating section 14 of the transmitting device 1 perform data frame allocation and data frame loss measurement frame duplication for the first frame set 5-1. Next, the transmitted data frame allocating section 12 and the data frame loss measurement frame duplicating section 14 of the transmitting device 1 perform data frame allocation and data frame loss measurement frame duplication for the second frame set 5-2.

In the transmitting and receiving link 3-1, in the first frame set 5-1, four data frames 51-11 pass first, and one data frame loss measurement frame 52-11 passes after that. In the second frame set 5-2, one data frame 51-21 passes first, and one data frame loss measurement frame 52-21 passes after that.

In the transmitting and receiving link 3-2, in the first frame set 5-1, two data frames 51-12 pass first, and one data frame loss measurement frame 52-12 passes after that. In the second frame set 5-2, one data frame 51-22 passes first, and one data frame Loss measurement frame 52-22 passes after that.

In the transmitting and receiving link 3-3, in the first frame set 5-1, one data frame 51-13 passes first, and one data frame loss measurement frame 52-13 passes after that. In the second frame set 5-2, one data frame 51-23 passes first, and one data frame loss measurement frame 52-23 passes after that.

Next, a method of transmitting and receiving data between the transmitting device 1 and the receiving device 2 of Embodiment 2 which is shown in FIG. 9 will be described. In the transmitting device 1, the frame transmitting section 15 transmits to each of the plurality of transmitting and receiving links 3-1, 3-2, and 3-3 the data frame loss measurement frames which were duplicated using the data frame loss measurement frame duplicating section 14 and the data frames which were allocated using the transmission data frame allocating section 12 in that sequence. In the receiving device 2, the frame receiving section 21 receives in each of the plurality of transmitting and receiving links 3-1, 3-2, and 3-3 the data frame loss measurement frames which were duplicated using the data frame loss measurement frame duplicating section 14 and the data frames which were allocated using the transmission data frame allocating section 12 in that sequence.

Specifically, frame sets 5 pass through each of the plurality of transmitting and receiving links 3-1, 3-2, and 3-3 in the sequence of the first frame set 5-1 first, and then the second frame set 5-2. Firstly, the transmitted data frame allocating section 12 and the data frame loss measurement frame duplicating section 14 of the transmitting device 1 perform data frame allocation and data frame loss measurement frame duplication for the first frame set 5-1. Next, the transmitted data frame allocating section 12 and the data frame loss measurement frame duplicating section 14 of the transmitting device 1 perform data frame allocation and data frame loss measurement frame duplication for the second frame set 5-2.

In the transmitting and receiving link 3-1, in the first frame set 5-1, the one data frame loss measurement frame 52-11 passes first, and the four data frames 51-11 pass after that. In the second frame set 5-2, the one data frame loss measurement frame 52-21 passes first, and the one data frame 51-21 passes after that.

In the transmitting and receiving link 3-2, in the first frame set 5-1, the one data frame loss measurement frame 52-12 passes first, and the two data frames 51-12 pass after that. In the second frame set 5-2, the one data frame loss measurement frame 52-22 passes first, and the one data frame 51-22 passes after that.

In the transmitting and receiving link 3-3, in the first frame set 5-1, the one data frame loss measurement frame 52-13 passes first, and the one data frame 51-13 passes after that. In the second frame set 5-2, the one data frame loss measurement frame 52-23 passes first, and the one data frame 51-23 passes after that.

IN FIG. 8 and FIG. 9, firstly, the frame receiving section 21 of the receiving device 2 receives in the transmitting and receiving link 3-3 the data frame 51-23 which is contained in the second frame set 5-2. Next, the frame receiving section 21 of the receiving device 2 receives in the transmitting and receiving link 3-1 the last data frame from among the data frames 51-11 which are contained in the first frame set 5-1.

In FIG. 8, the frame receiving section 21 of the receiving device 2 detects that the last data frame from among the data frames 51-11 passes before the data frame loss measurement frame 52-11 in the first frame set 5-1. In addition, the frame receiving section 21 of the receiving device 2 detects that the last data frame from among the data frames 51-11 is a data frame from the first frame set 5-1.

In FIG. 8, the frame receiving section 21 of the receiving device 2 detects that the data frame 51-23 passes before the data frame loss measurement frame 52-23 in the second frame set 5-2. In addition, the frame receiving section 21 of the receiving device 2 detects that the data frame 51-23 is a data frame from the second frame set 5-2.

In FIG. 9, the frame receiving section 21 of the receiving device 2 detects that the last data frame from among the data frames 51-11 passes after the data frame loss measurement frame 52-11 in the first frame set 5-1. In addition, the frame receiving section 21 of the receiving device 2 detects that the last data frame from among the data frames 51-11 is a data frame from the first frame set 5-1.

In FIG. 9, the frame receiving section 21 of the receiving device 2 detects that the data frame 51-23 passes after the data frame loss measurement frame 52-23 in the second frame set 5-2. In addition, the frame receiving section 21 of the receiving device 2 detects that the data frame 51-23 is a data frame from the second frame set 5-2.

In FIG. 8 and FIG. 9, the received data frame number measuring section 22 of the receiving device 2 measures the total number of the data frames 51-11, 51-12, and 51-13 which are contained in the first frame set 5-1 which was received in the plurality of transmitting and receiving links 3-1, 3-2, and 3-3. However, the received data frame number measuring section 22 of the receiving device 2 performs this measurement while excluding the number of the data frame 51-23 which is contained in the second frame set 5-2 which is received in the transmitting and receiving links 3-3. Accordingly, it is possible to prevent the received data frame measuring section 22 of the receiving device 2 mistakenly recognizing data frames which are in reality contained in the second frame set 5-2 as being data frames which are contained in the first frame set 5-1.

In FIG. 8 and FIG. 9, the data frame storage section 24 of the receiving device 2 stores the data frame 51-23 which is contained in the second frame set 5-2 which was received in the transmitting and receiving link 3-3. However, the data frame storage section 24 of the receiving device 2 only stores this data frame until the total number of the data frames 51-11, 51-12, and 51-13 which are contained in the first frame set 5-1 which was received in the plurality of transmitting and receiving links 3-1, 3-2, and 3-3 has been measured. Accordingly, it is possible to prevent the received data frame measuring section 22 of the receiving device 2 mistakenly recognizing data frames which are in reality contained in the second frame set 5-2 as being data frames which are contained in the first frame set 5-1.

(Embodiment 3)

Figure 10:
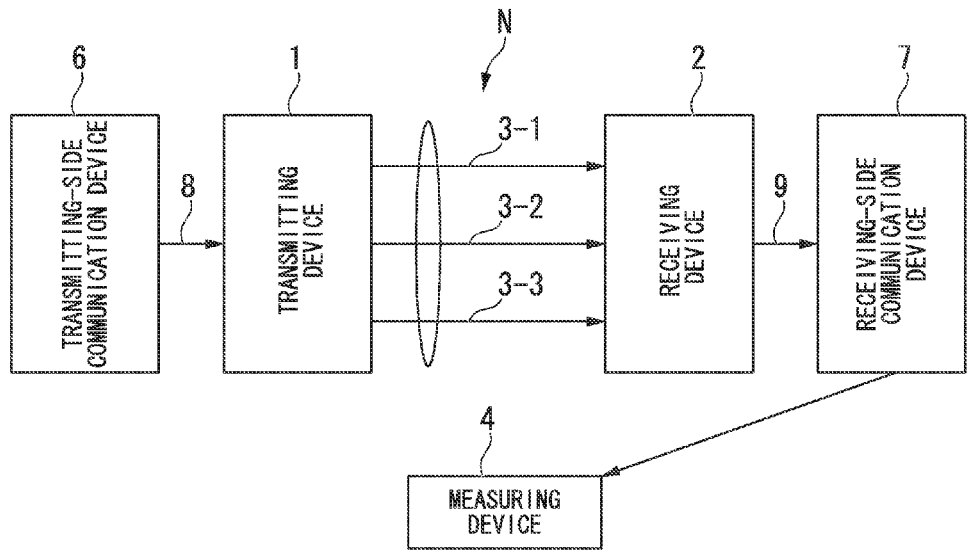
FIG. 10 is a view showing the structure of a communication system according to Embodiment 3.

The structure of a communication system of Embodiment 3 is shown in FIG. 10. A communication system N is provided with a transmitting device 1, a receiving device 2, a plurality of transmitting and receiving links 3-1, 3-2, 3-3, a measuring device 4, a transmitting-side communication device 6, a receiving-side communication device 7, a transmitting and receiving link 8, and a transmitting and receiving link 9. The transmitting device 1, the receiving device 2, the plurality of transmitting and receiving links 3-1, 3-2, 3-3, and the measuring device 4 are substantially the same as those in Embodiments 1-3. The receiving-side communication device 6 transmits data frames to the transmitting device 1. The receiving-side communication device 7 receives data frames from the receiving device 2. The transmitting and receiving link 8 does not form a link aggregation, and connects the transmitting-side communication device 6 to the transmitting device 1. The transmitting and receiving link 9 does not form a link aggregation, and connects the receiving device 2 to the receiving-side communication device 7. The measuring device 4 measures data frame loss between the transmitting device 1 and the receiving device 2, data frame loss between the transmitting-side communication device 6 and the transmitting device 1, and data frame loss between the receiving device 2 and the receiving-side communication device 7. By installing in the communication system N a data frame loss measuring program which causes the steps described below to be executed, the data frame loss measuring method described below can be executed.

The transmitting device 1 will now be described. The data frame loss measurement frame writing section 13 writes in a data frame loss measurement frame the total number of data frames received in the transmitting device 1 from the transmitting-side communication device 6. Accordingly, the measurement device 4 is able to measure data frame loss between the transmitting-side communication device 6 and the transmitting device 1. Here, by installing in the transmitting device 1 a transmitting program which causes the steps described below to be executed, the transmitting method described below can be executed.

The receiving device 2 will now be described. The data frame loss measurement frame writing section 23 writes in a data frame loss measurement frame the total number of data frames transmitted from the receiving device 2 to the receiving-side communication device 7. Accordingly, the measuring device 4 is able to measure the data frame loss between the receiving device 2 and the receiving-side communication device 7. In addition, the data frame loss measurement frame writing section 23 writes the total number of data frames received by the plurality of transmitting and receiving links 3-1, 3-2, and 3-3 in a portion of the data frame loss measurement frames received by the plurality of transmitting and receiving links 3-1, 3-2, and 3-3 which is equal to the number of the transmitting and receiving links 9. Furthermore, the data frame loss measurement frame writing section 23 disposes of the portion of the data frame loss measurement frames received by the plurality of transmitting and receiving links 3-1, 3-2, and 3-3 which exceeds the number of the transmitting and receiving links 9. Accordingly, the receiving device 2 is able to reduce unnecessary writing in the data frame loss measurement frames. Here, by installing in the receiving device 2 a receiving program which causes the steps described below to be executed, the receiving method described below can be executed.

The measuring device 4 will now be described. In the same way as in Embodiment 1 and Embodiment 2, the measuring device 4 measures data frame loss between the transmitting device 1 and the receiving device 2 in Embodiment 3 as well. By installing in the measuring device 4 a measuring program which causes the steps described below to be executed, the measuring method described below can be executed. The measuring device is installed independently from the receiving-side communication device 7, however, they may also be installed as an integrated unit.

The data frame loss measurement frame acquiring section 41 acquires a data frame loss measurement frame in which the number of data frames transmitted by the transmitting-side communication device 6, and the total number of data frames received by the transmitting device 1 have been written. The data frame loss measuring section 42 measures the data frame loss between the transmitting-side communication device 6, and the transmitting device 1 by subtracting the total number of data frames received by the transmitting device 1 from the number of data frames transmitted by the transmitting-side communication device 6.

The data frame loss measurement frame acquiring section 41 acquires a data frame loss measurement frame in which the total number of data frames transmitted by the receiving device 2, and the number of data frames received by the receiving-side communication device 7 have been written. The data frame loss measuring section 42 measures the data frame loss between the receiving device 2 and the receiving-side communication device 7 by subtracting the number of data frames received by the receiving side communication device 7 from the total number of data frames transmitted by the receiving device 2.

The transmitting steps described using FIG. 5, FIG. 8, and FIG. 9 are substantially the same as in Embodiments 1-3. The receiving steps described using FIG. 6, FIG. 8, and FIG. 9 are substantially the same as in Embodiments 1-3.

Figure 11:
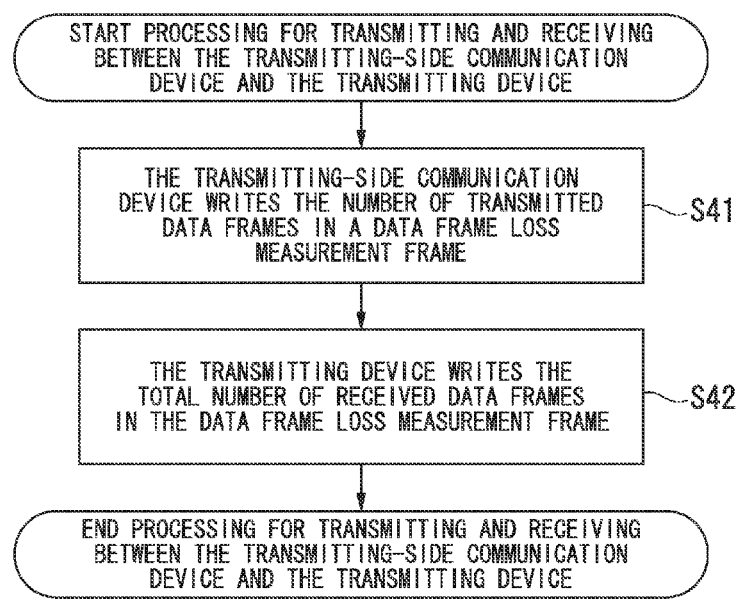
FIG. 11 is a view showing a transmitting and receiving method employed between a communication device on the transmitting side and a transmitting device according to Embodiment 3.

A transmitting and receiving method employed between the transmitting-side communication device and the transmitting device of Embodiment 3 is shown in FIG. 11. In a transmitted frame writing step, the transmitting-side communication device 6 writes the number of data frames transmitted to the transmitting device 1 in a data frame loss measurement frame which is transmitted to the transmitting device 1 (step S41). In a data frame loss measurement frame writing step, the data frame loss measurement frame writing section 13 writes the total number of data frames received from the transmitting-side communication device 6 in a data frame loss measurement frame which is received from the transmitting-side communication device 6 (step S42). Accordingly, the measuring device 4 is able to measure the data frame loss between the transmitting-side communication device 6 and the transmitting device 1.

Figure 12:
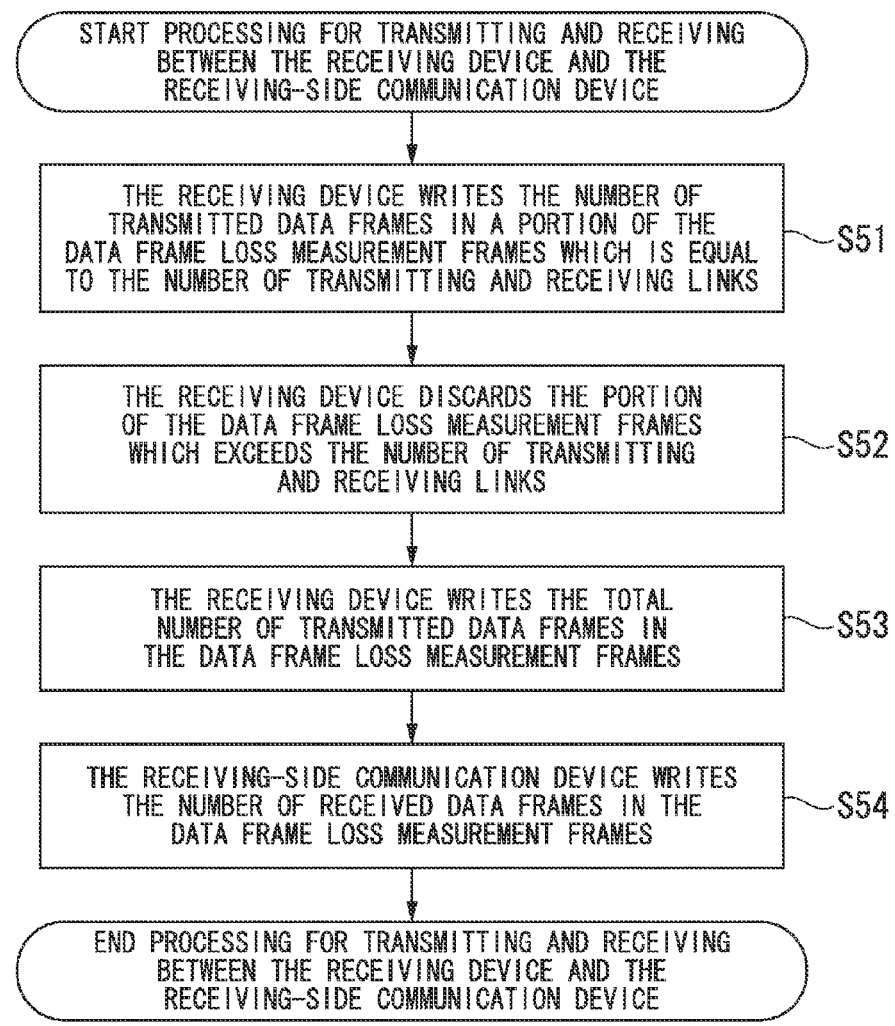
FIG. 12 is a view showing a transmitting and receiving method employed between a receiving device and a communication device on the receiving side according to Embodiment 3.

A transmitting and receiving method employed between the receiving device and the receiving-side communication device of Embodiment 3 is shown in FIG. 12. Firstly, a data frame loss measurement frame writing step will be described. The data frame loss measurement frame writing section 23 writes the total number of data frames received by the plurality of transmitting and receiving links 3-1, 3-2, and 3-3 in a portion of the data frame loss measurement frames received by the plurality of transmitting and receiving links 3-1, 3-2, and 3-3 which is equal to the number of the transmitting and receiving links 9 (step S51). In addition, the data frame loss measurement frame writing section 23 disposes of the portion of the data frame loss measurement frames received by the plurality of transmitting and receiving links 3-1, 3-2, and 3-3 which exceeds the number of the transmitting and receiving links 9 (step S52). Accordingly, the receiving device 2 is able to reduce unnecessary writing in the data frame loss measurement frames. Furthermore, the data frame loss measurement frame writing section 23 writes the total number of data frames transmitted to the receiving-side communication device 7 in a data frame loss measurement frame which is transmitted to the receiving-side communication device 7 (step S53). Accordingly, the measuring device 4 is able to measure the data frame loss between the receiving device 2 and the receiving-side communication device 7.

Next, a received frame writing step will be described. The receiving-side communication device 7 writes the number of data frames received from the receiving device 2 in a data frame loss measurement frame which is received from the receiving device 2 (step S54). Accordingly, the measuring device 4 is able to measure the data frame loss between the receiving device 2 and the receiving-side communication device 7.

Figure 13:
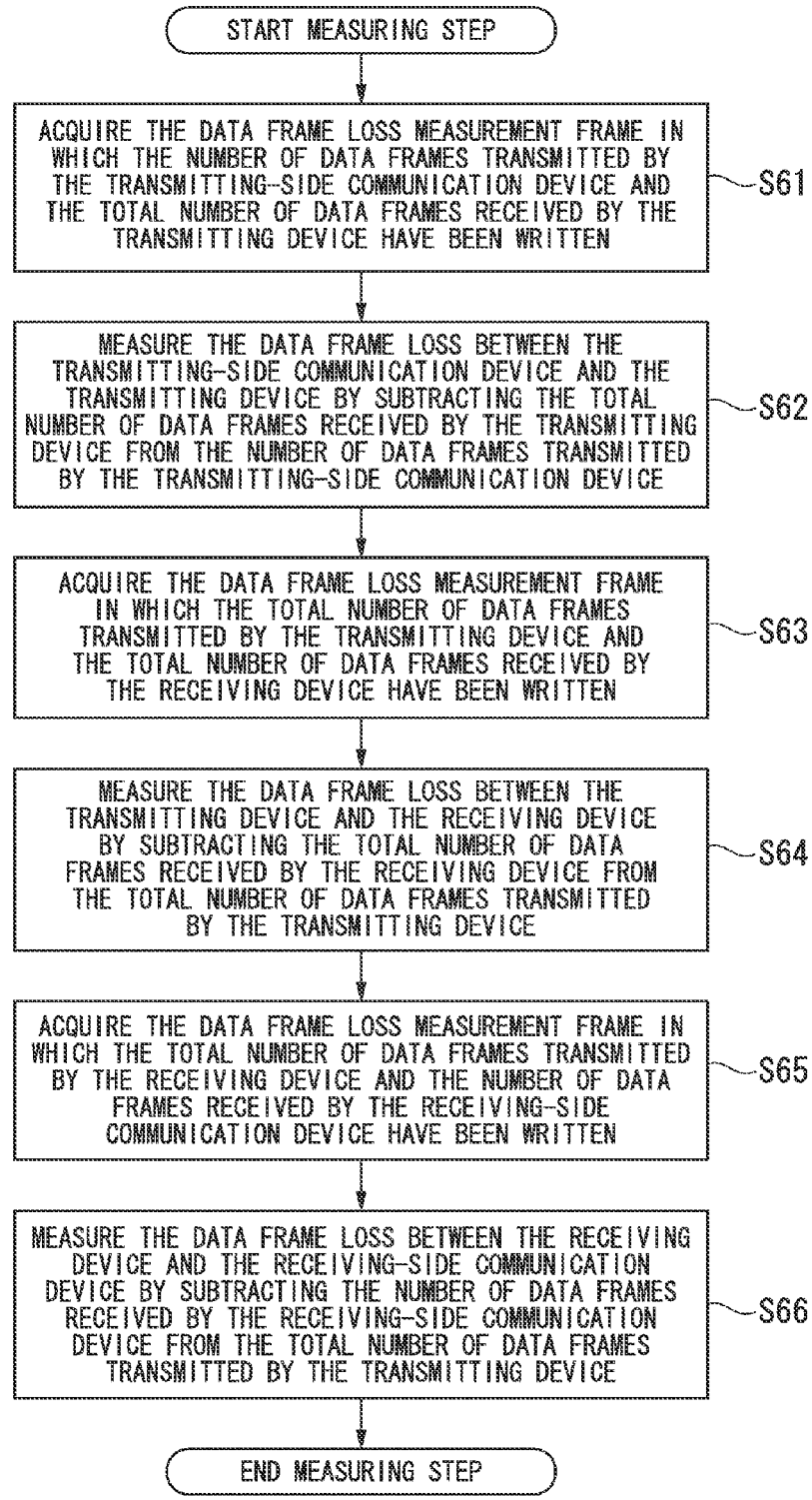
FIG. 13 is a view showing the contents of a measuring step according to Embodiment 3.

The contents of a measuring step of Embodiment 3 are shown in FIG. 13. In step S61 and step S62, the measuring device 4 measures the data frame loss between the transmitting-side communication device 6 and the transmitting device 1. In step S63 and step S64, the measuring device 4 measures the data frame loss between the transmitting device 1 and the receiving device 2. In step S65 and step S66, the measuring device 4 measures the data frame loss between the receiving device 2 and the receiving-side communication device 7. Because step S63 and step S64 of FIG. 13 are substantially the same as step S31 and step S32 of FIG. 7, no description thereof is given here.

In a data frame loss measurement frame acquiring step, the data frame loss measurement frame acquiring section 41 acquires the data frame loss measurement frame in which the number of data frames transmitted by the transmitting-side communication device 6, and the total number of data frames received by the transmitting device 1 have been written (step S61). In a data frame loss measuring step, the data frame loss measuring section 42 measures the data frame loss between the transmitting-side communication device 6 and the transmitting device 1 by subtracting the total number of data frames received by the transmitting device 1 from the number of data frames transmitted by the transmitting-side communication device 6 (step S62).

In a data frame loss measurement frame acquiring step, the data frame loss measurement frame acquiring section 41 acquires a data frame loss measurement frame in which the total number of data frames transmitted by the receiving device 2 and the number of data frames received by the receiving-side communication device 7 have been written (step S65). In a data frame loss measuring step, the data frame loss measuring section 42 measures the data frame loss between the receiving device 2 and the receiving-side communication device 7 by subtracting the number of data frames received by the receiving-side communication device 7 from the total number of data frames transmitted by the receiving device 2 (step S66).

In Embodiment 3, neither of the transmitting and receiving link 8 and the transmitting and receiving link 9 form a link aggregation. However, it is also possible for at least one of the transmitting and receiving link 8 and the transmitting and receiving link 9 to form a link aggregation. The transmitting and receiving method used in the segment where the link aggregation is formed is the same as the transmitting and receiving method used between the transmitting device 1 and the receiving device 2.

(Embodiment 4)

Figure 14:
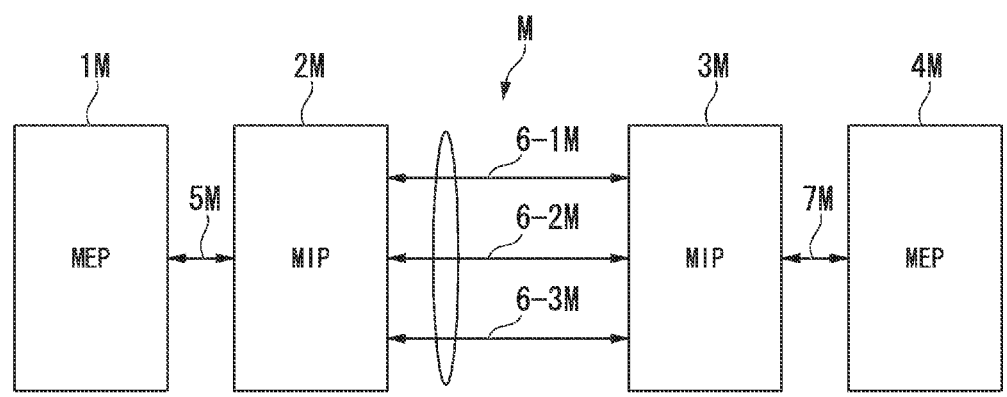
FIG. 14 is a view showing the structure of a communication system according to Embodiment 4.

The structure of a communication system of Embodiment 4 is shown in FIG. 14. A communication system M is provided with an MEP 1M, an MIP 2M, an MIP 3M, an MEP 4M, a transmitting and receiving link 5M, transmitting and receiving links 6-1M, 6-2M, and 6-3M, and a transmitting and receiving link 7M. The transmitting and receiving link 5M connects the MEP 1M to the MEP 2M, and is formed by a single transmitting and receiving link. The transmitting and receiving links 6-1M, 6-2M, and 6-3M connect the MIP 2M to the MIP 3M, and are formed by three transmitting and receiving links. The transmitting and receiving link 7M connects the MIP 3M to the MEP 4M, and is formed by a single transmitting and receiving link. When the MEP 1M transmits a data frame to the MEP 4M, the MEP 1M, the MIP 2M, the MIP 3M, and the MEP 4M correspond respectively to the transmitting-side communication device 6, the transmitting device 1, the receiving device 2, and the receiving-side communication device 7. When the MEP 4M transmits a data frame to the MEP 1M, the MEP 1M, the MIP 2M, the MIP 3M, and the MEP 4M correspond respectively to the receiving-side communication device 7, the receiving device 2, the transmitting device 1, and the transmitting-side communication device 6.

Figure 15:
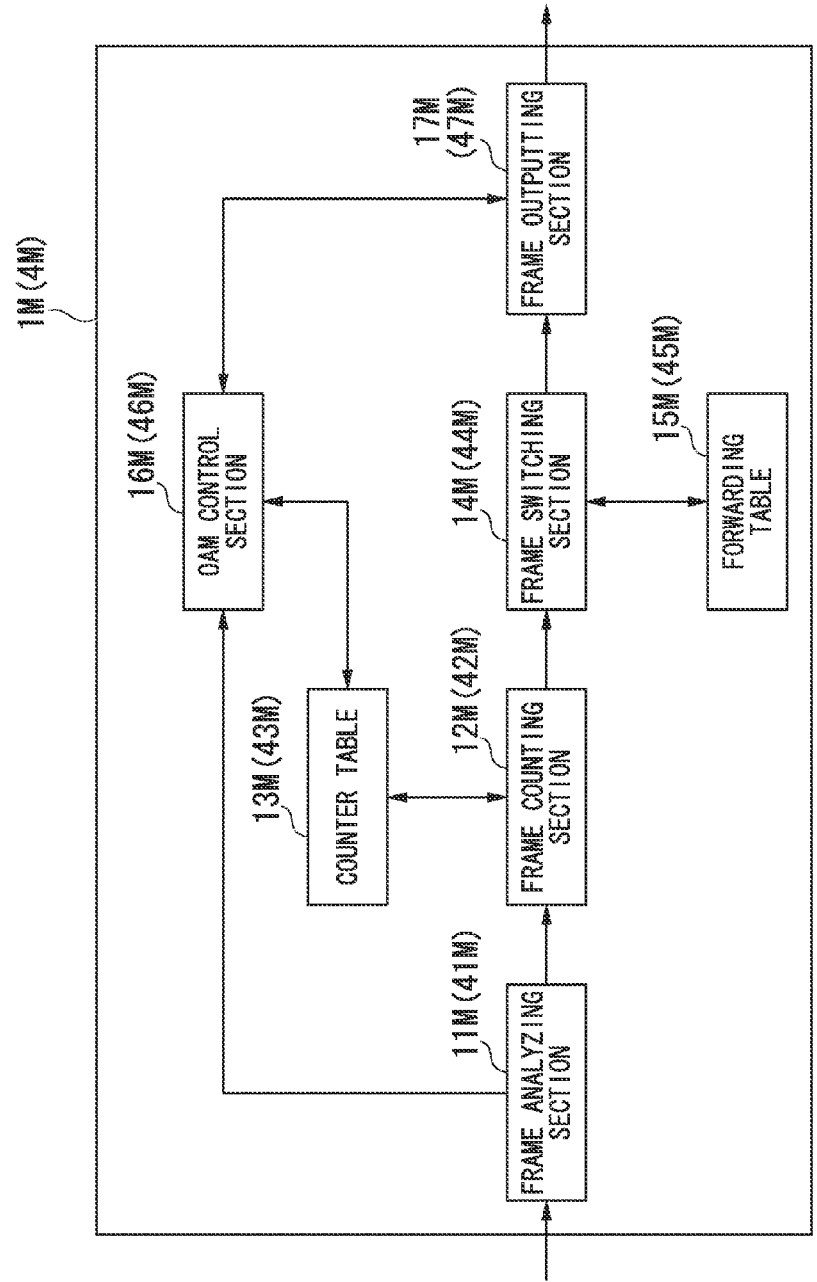
FIG. 15 is a view showing the structure of an MEP according to Embodiment 4.

The structure of the MEP of Embodiment 4 is shown in FIG. 15. The MEP 1M (4M) is provided with a frame analyzing section 11M (41M), a frame counting section 12M (42M), a counter table 13M (43M), a frame switching section 14M (44M), a forwarding table 15M (45M), an OAM control section 16M (46M), and a frame outputting section 17M (47M). Because the structures of the MEP 1M and the MEP 4M are the same, only the MEP 1M will be described.

The frame analyzing section 11M determines the frame type when a frame is input, and transfers data frames to the frame counting section 12M, and OAM frames to the OAM control section 16M. The frame counting section 12M counts the frame number of input data frames, and holds this count value in the counter table 13M. Data frames are transferred to the frame switching section 14M. When the frame switching section 14M receives a data frame, it refers to the forwarding table 15M so as to obtain output port information, and transfers the data frame to the frame outputting section 17M. The forwarding table 15M stores output port information which corresponds to destination address information. The OAM control section 16M performs predetermined OAM processing in accordance with the type OAM frame which is received from the frame analyzing section 11M. In the case of LM (Loss Measurement) processing, predetermined LM processing is performed with reference made to the counter information in the counter table 13M. The detailed structure of the OAM control section 16M is described below using FIG. 16. When predetermined OAM processing is performed, an OAM frame is transferred to the frame outputting section 17M. The frame outputting section 17M outputs to predetermined output ports data frames received from the frame switching section 14M, and OAM frames received from the OAM control section 16M.

Figure 16:
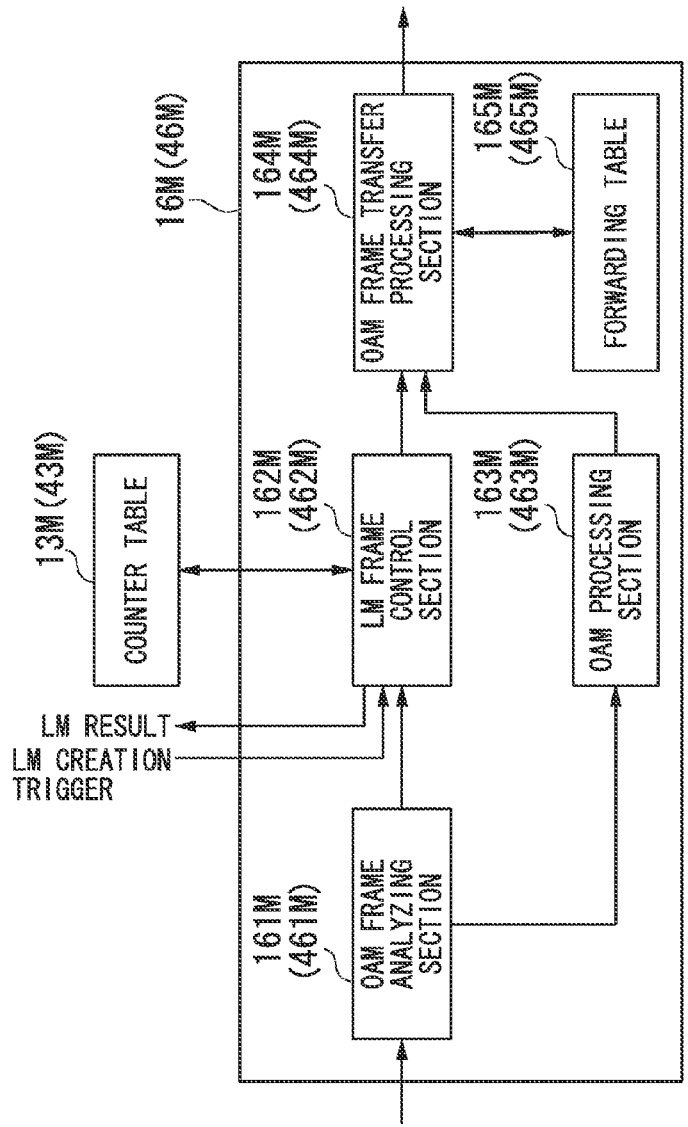
FIG. 16 is a view showing the structure of an OAM control section according to Embodiment 4.

The structure of the OAM control section of Embodiment 4 is shown in FIG. 16. The OAM control section 16M (46M) is provided with an OAM frame analyzing section 161M (461M), an LM frame control section 162M (462M), an OAM processing section 163M (463M), an OAM frame transfer processing section 164M (464M), and a forwarding table 165M (465M). Because the structures of the OAM control section 16M and the OAM control section 46M are the same, only the OAM control section 16M will be described.

The OAM frame analyzing section 161M analyzes OAM frames received from the frame analyzing section 11M, and transfers LMM/LMR (Loss Measurement Message/Loss Measurement Reply) frames to the LM frame control section 162M, and transfers all other frames to the OAM processing section 163M.

The processing performed by the LM frame control section 162M on the transmitting side is different from that performed on the opposite side. On the transmitting side, when an LM creation trigger is received from an external setting interface or the like, the LM frame control section 162M creates an LMM frame, and writes the transmission counter value therein, and then transfers this LMM frame to the OAM frame transfer processing section 164M. In addition, on the transmitting side, when an LMR frame is received, the LMR frame is terminated. Furthermore, on the transmitting side, End-to-End frame loss as well as the frame loss in each segment are calculated from information stored in the LMR frame, and the results are output to an external memory and an external output interface and the like. On the opposite side, when an LMM frame is received, the LMM frame is terminated, and an LMR frame is created using the information within the LMM frame, and this LMR frame is then transferred to the OAM frame transfer processing section 164M. The LM frame control section 162M corresponds to the data frame measurement frame acquiring section and the data frame loss measuring section of a measuring device.

The OAM frame transfer processing section 164M refers to the forwarding table 165M so as to acquire an output port for the OAM frames received from the LM frame control section 162M and the OAM processing section 163M, and then transfers these to the frame outputting section 17M. When the OAM processing section 163M receives OAM frames other than the LM frames from the OAM frame analyzing section 161M, it performs predetermined OAM processing thereon, and then transfers the OAM frames to the OAM frame transfer processing section 164M. Note that in the present invention, because processing relating to LM is the subject of the invention, any description of OAM processing other than LM processing is omitted. Furthermore, portions relating to the LM processing (i.e., the LM frame control section 162M) are listed in a separate block from the OAM processing section 163M, however, in a typical embodiment, there are cases in which the portions relating to LM processing are also included in the OAM processing section 163M. The forwarding table 165M stores output port information for destination address information for the OAM frames.

Figure 17:
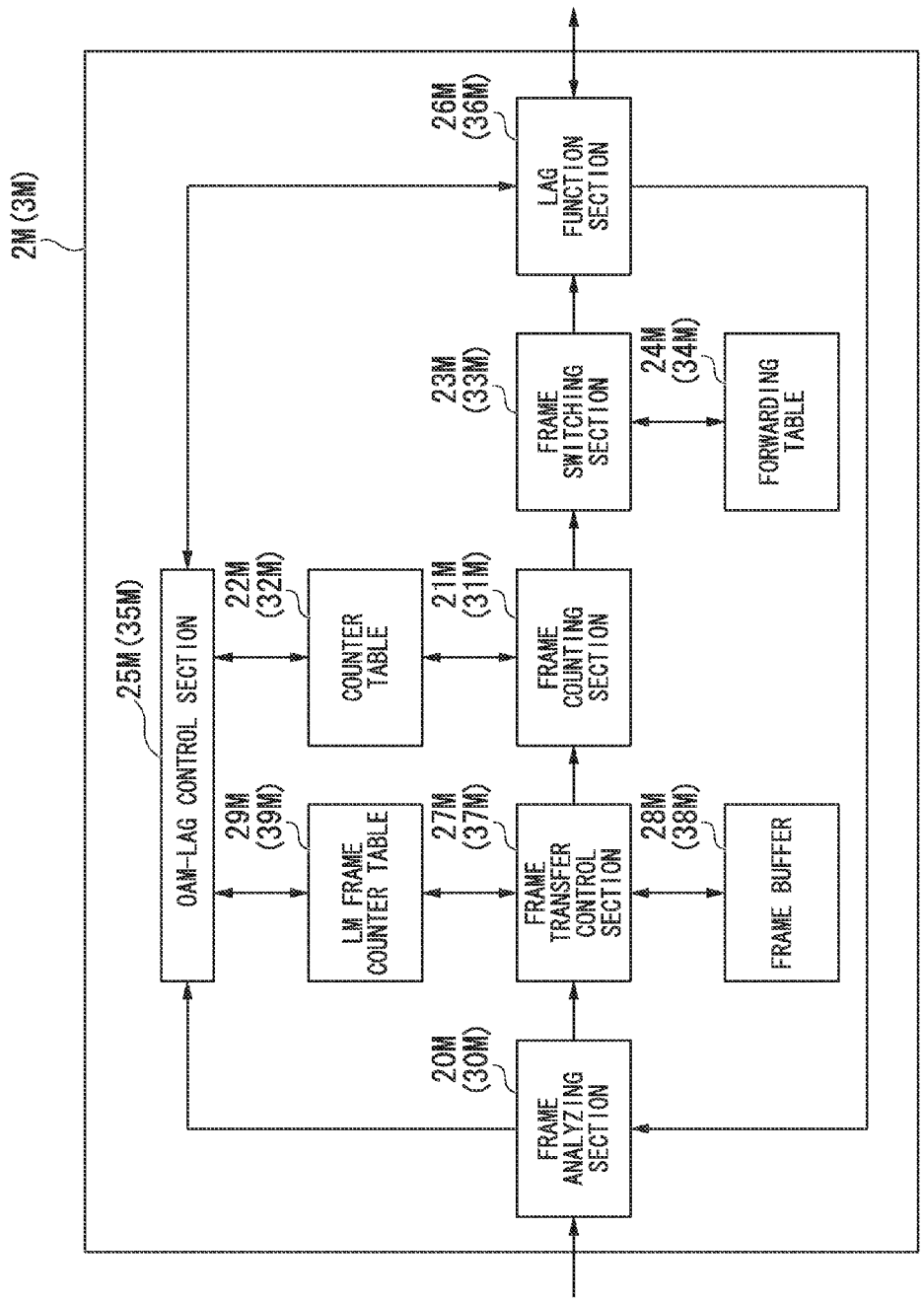
FIG. 17 is a view showing the structure of an MIP according to Embodiment 4.

The structure of an MIP of Embodiment 4 is shown in FIG. 17. The MIP 2M (3M) is provided with a frame analyzing section 20M (30M), a frame counting section 21M (31M), a counter table 22M (32M), a frame switching section 23M (33M), a forwarding table 24M (34M), an OAM-LAG (link aggregation) control section 25M (35M), an LAG function section 26M (36M), a frame transfer control section 27M (37M), a frame buffer 28M (38M), and an LM frame counter table 29M (39M). Because the structures of the MIP 2M and the MIP 3M are the same, only the MIP 2M will be described.

The frame analyzing section 20M, the frame counting section 21M, the counter table 22M, the frame switching section 23M, and the forwarding table 24M perform the same operations respectively as the frame analyzing section 11M, the frame counting section 12M, the counter table 13M, the frame switching section 14M, and the forwarding table 15M. The frame counting section 21M corresponds to the transmitted data frame number measuring section of the transmitting device and the received data frame number measuring section of the receiving device. The frame switching section 23M corresponds to the transmitted data frame allocating section of the transmitting device. The LAG function section 26M corresponds to the data frame loss measurement frame duplicating section and frame transmitting section of the transmitting device, and also to the frame receiving section of the receiving device.

The OAM-LAG control section 25M executes link aggregation processing with opposing devices using a plurality of ports. The link aggregation function is a technology in which a plurality of links which extend in parallel between two switches are integrated, so that theoretically they can be treated as a single link. In addition, the method used to allocate frames to each link of the link aggregation differs depending on the device manufacturer. The frame transfer control section 27M refers to the LM frame counter table 29, and stores data frames in the frame buffer 8M in accordance with the number of LM frames which have been received by the links of the link aggregation. The number of LM frames received by the devices is stored in the LM frame counter table 29M. The OAM-LAG control section 25M corresponds to the data frame loss measurement frame writing sections of the transmitting device and receiving device. The data frame buffer 28M corresponds to the data frame storage section of the receiving device.

Figure 18:
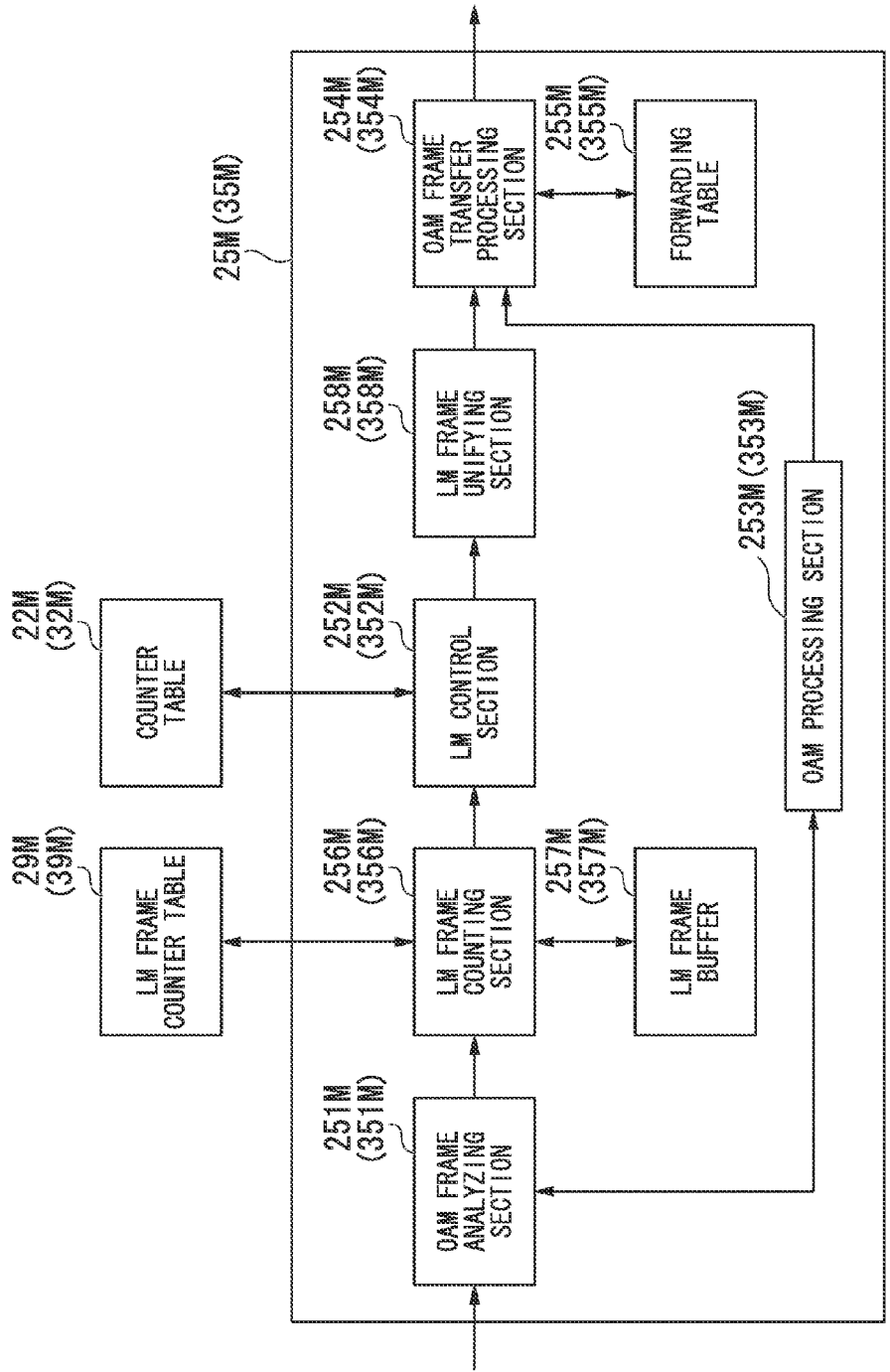
FIG. 18 is a view showing the structure of an OAM-LAG control section according to Embodiment 4.

The structure of the OAM-LAG control section of Embodiment 4 is shown in FIG. 18. The OAM-LAG control section 25M (35M) is provided with an OAM frame analyzing section 251M (351M), an LM frame control section 252M (352M), an OAM processing section 253M (353M), an OAM frame transfer processing section 254M (354M), a forwarding table 255M (355M), an LM frame counting section 256M (356M), an LM frame buffer 257M (357M), and an LM frame unifying section 258M (358M). Because the structures of the OAM-LAG control section 25M and the OAM-LAG control section 35M are the same, only the OAM-LAG control section 25M is described here.

The OAM frame analyzing section 251M, the LM frame control section 252M, the OAM processing section 253M, the OAM frame transfer processing section 254M, and the forwarding table 255M perform the same operations respectively as the OAM frame analyzing section 161M, the LM frame control section 162M, the OAM processing section 163M, the OAM frame transfer processing section 164M, and the forwarding table 165M.

The LM frame counting section 256M counts the number of LM frames received by the device, and writes the number of frames and the count value of the transmitting-side MEP in the LM frame counter table 29M. When an LM frame is received in which the count value of the transmitting-side MEP is different from the LM frame currently being counted, that LM frame is stored in the LM frame buffer 257M. When the LM frame unifying section 258M has received the same number of LM frames as the number of links in the link aggregation, it writes the total value of all the values written in the frame in one LM frame from among the received LM frames, and transmits this total value to the OAM frame transfer processing section 254M. Moreover, when it has received the same number of LM frames as the number of links in the link aggregation, it discards LM frames transmitted by other link aggregation.

A method of measuring data frame loss according to Embodiment 4 is shown in FIG. 19. In step S71, the MEP 1M transmits an LMM frame and a data frame to the MIP 2M. In step S72, the MIP 2M transmits the LMM frame and data frame to the MIP 3M. In step S73, the MIP 3M transmits the LMM frame and data frame to the MEP 4M. In step S74, the MEP 4M transmits an LMR frame and a data frame to the MIP 3M. In step S75, the MIP 3M transmits the LMR frame and the data frame to the MIP 2M. In step S76, the MIP 2M transmits the LMR frame and the data frame to the MEP 1M. In step S77, the MEP 1M measures the data frame loss. The respective steps S71 through S77 will now be described.

Step S71 will now be described. When the LM frame control section 162M receives an LM creation trigger, it creates an LMM frame. The LM frame control section 162M refers to the counter table 13M so as to acquire a transmission count value TxFCr (tc), and writes this in the LMM frame. The LM frame control section 162M transfers the LMM frame to the OAM frame transfer processing section 164M. The OAM frame transfer processing section 164M refers to the forwarding table 165M so as to acquire an output port, and transfers the LMM frame to the frame outputting section 17M so that the LMM frame is transferred to the subsequent device.

Step S72 will now be described. In the MIP 2M, the frame transfer control section 27M, the LM frame counter table 29M, the LM frame counting section 256M, and the LM frame unifying section 258M are not used. The data frame and the LMM frame pass through each block. When the LM frame control section 252M receives the LMM frame from the OAM frame analyzing section 251M, it refers to the counter table 22M and writes its own MIP-ID as well as a transmission count value TxFCr (tc)_mip2M in the LMM frame.

The OAM frame transfer processing section 254M refers to the forwarding table 255M so as to determine an output port, and then transmits the LMM frame to the LAG function section 26M. When the LAG function section 26M receives the LMM frame, it duplicates the LMM frames received in all of the links which make up the link aggregation, and then transmits these to the next device.

Step S73 will now be described. The LMM frames received from the LAG function section 36M pass through the frame analyzing section 30M, and are transported to the OAM-LAG control section 35M. The LM frame counting section 356M counts the number of LMM frames received from all of the links in the link aggregation, and writes this number in the LM frame counter table 39M. Moreover, when the LM frame counting section 356M receives an LMM frame whose count value is different from the transmitting-side MEP, it stores this LMM frame in the LM frame buffer 357M without counting it. The stored frames are not counted unless no LMM frames which have the same count value as the transmitting-side MEP are received from all of the links which make up a link aggregation.

The LM frame control section 352M refers to the counter table 32M and writes its own MIP-ID as well as the count value TxFCf (tc)_mip3M (LINK A-LINK C) for each link in the LMM frames which have been sent from all of the links in the link aggregation, and then transfers these to the LM frame unifying section 358M. When the LM frame unifying section 358M has received LMM frames from all of the links in the link aggregation, it adds up all of the count values written in the LMM frames of each link. The LM frame unifying section 358M then writes the count value sum in one of the LMM frames, and transfers that LMM frame to the OAM frame transfer processing section 354M. Furthermore, the LM frame unifying section 358 also discards frames in which the count value sum is not written.

The OAM frame transfer processing section 354M refers to the forwarding table 355M in order to decide the output port, and then transfers the LMM frame to the LAG function section 36M. The LAG function section 36M then transfers the LMM frame from the output port to the next device.

Step S74 will now be described. When the LM frame control section 462M receives an LMM frame from the OAM frame analyzing section 461M, it acquires a received counter value RxFCf (tc) by referring to the counter table 43M. The LM frame control section 462M terminates the LMM frame, and then creates an LMR frame using the information within the LMM frame.

The LM frame control section 462M then refers to the counter table 43M, and records a transmission count value TxFCb (tc) in the created LMR frame which it then transfers to the OAM frame transfer processing section 464M. The OAM frame transfer processing section 464M then refers to the forwarding table 465M in order to acquire an output port, and transfers this to the frame outputting section 47M so that the LMR frame is transferred to the MEP 1M address.

The LMM frame at the point when the processing of step S73 of Embodiment 4 is ended is shown in FIG. 20A. A field for writing the MIP-IDs and the MIP transmission counter values has been added to a Y.1731 LMM frame. When the MIP-ID is the ID of the MIP 2M, then TxFCf_mip2M is recorded as the transmission counter value, while when the MIP-ID is the ID of the MIP 3M, TxFCf_mip3M is recorded as the transmission counter value.

In step S75, in the same way as in step S72, the MIP 3M writes its own MIP-ID as well as the transmission counter value TxFCb_mip3M in the LMR frame, and transfers this LMR frame to the next device. In step S76, in the same way as in step S73, the MIP 2M writes its own MIP-ID as well as the transmission counter value TxFCb_mip2M in the LMR frame, and transfers this LMR frame to the next device.

The LMR frame at the point when the processing of step S76 of Embodiment 4 is ended is shown in FIG. 20B. A field for writing the MIP-IDs and the MIP transmission counter values has been added to a Y.1731 LMM frame. When the MIP-ID is the ID of the MIP 2M, then TxFCb_mip2M is recorded as the transmission counter value, while when the MIP-ID is the ID of the MIP 3M, TxFCb_mip3M is recorded as the transmission counter value.

Step S77 will now be described. When the LM frame control section 162M receives an LMR frame from the OAM frame analyzing section 161M, it refers to the counter table 13M in order to acquire a reception counter value RcFCl (tc).

The LM frame control section 162M uses the following formula in order to calculate the End-to-End frame loss as well as the frame loss in each segment from the information stored in the LMR frame. Far-end shows a direction from the MEP 1M towards the MEP 4M, while Near-end shows a direction from the MEP 4M to the MEP 1M. f shows forward, while b shows back. Reference character t shows a cycle at which a data frame and an OAM frame are transmitted and received as a set, while c shows the current cycle, and p shows the previous cycle.

Loss (Far-end: End-to-End) =
$$|TxFCf(tc) - TxFCf(tp)| - |RxFCf(tc) - TxFCf(tp)|$$

Loss (Far-end: MEP1M − MIP2M) =
$$|TxFCf(tc) - TxFCf(tp)| - |TxFCf\_mip2M(tc) - TxFCf\_mip2M(tp)|$$

Loss (Far-end: MIP2M − MIP3M) =
$$|TxFCf\_mip2M(tc) - TxFCf\_mip2M(tp)| - |TxFCf\_mip3M(tc) - TxFCf\_mip3M(tp)|$$

Loss (Far-end: MIP3M − MEP4M) =
$$|TxFCf\_mip3M(tc) - TxFCf\_mip3M(tp)| - |RxFCf(tc) - RxFCf(tp)|$$

-continued

Loss (Near-end: End-to-End) =
$$|TxFCb(tc) - TxFCf(tp)| - |RxFCl(tc) - TxFCl(tp)|$$

Loss (Near-end: MEP4M − MIP3M) =
$$|TxFCb(tc) - TxFCb(tp)| - |TxFCb\_mip3M(tc) - TxFCb\_mip3M(tp)|$$

Loss (Near-end: MIP3M − MIP2M) =
$$|TxFCb\_mip3M(tc) - TxFCb\_mip3M(tp)| - |TxFCb\_mip2M(tc) - TxFCb\_mip2M(tp)|$$

Loss (Near-end: MIP2M − MEP1M) =
$$|TxFCb\_mip2M(tc) - TxFCb\_mip2M(tp)| - |RxFCl(tc) - RxFCl(tp)|$$

The End-to-End frame loss information which is the result of the LM and the frame loss information for each segment is output to the outside (i.e., to memory or to an external output interface or the like).

Figure 21A:
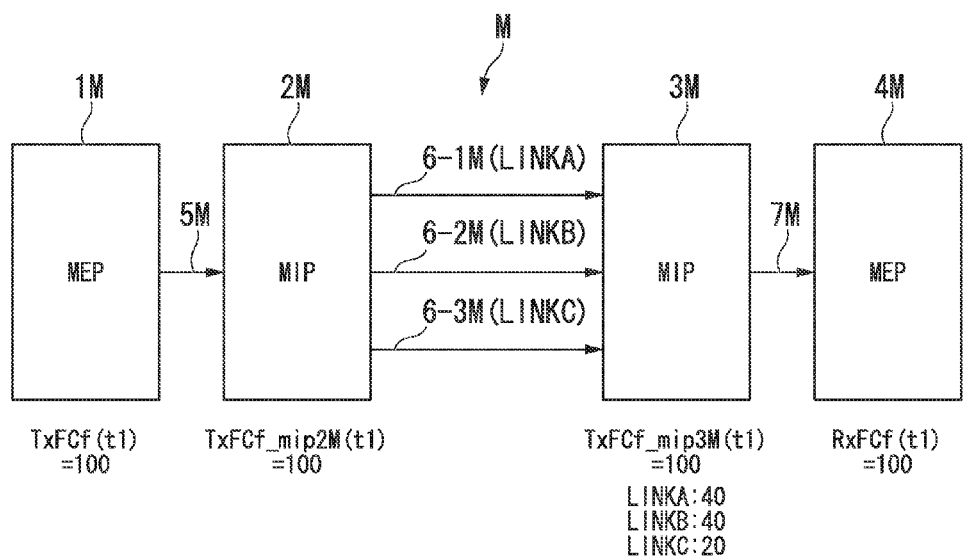
FIGS. 21A and 21B are block diagrams showing a data frame loss measuring method according to Embodiment 4.
Figure 21B:
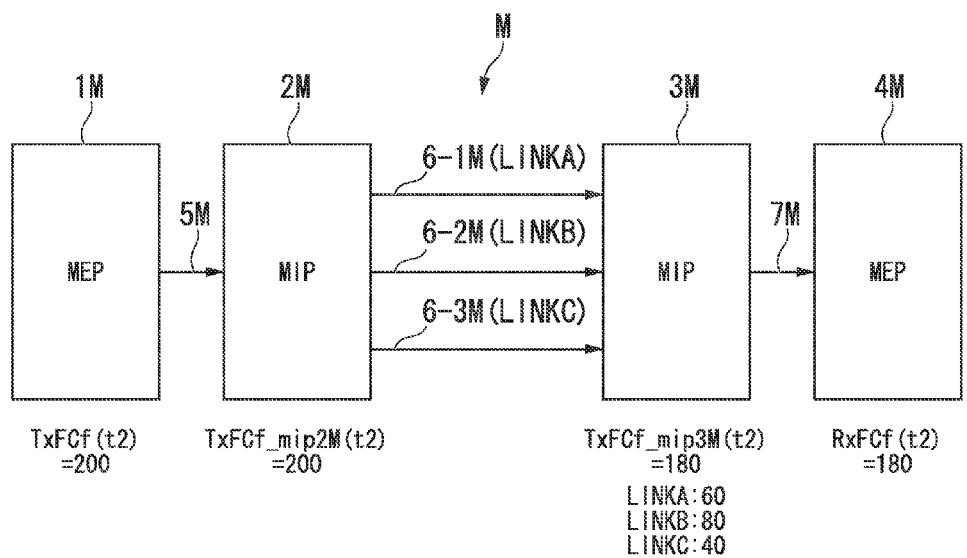

A method of measuring data frame loss according to Embodiment 4 is shown in FIGS. 21A and 21B. FIG. 21A shows a case in which a cycle T in which a data frame and an OAM frame are transmitted and received as a set=1, while FIG. 21B shows a case in which a cycle T in which a data frame and an OAM frame are transmitted and received as a set=2. In FIGS. 21A and 21B, the Far-end direction is described, however, the same applies for the Near-end direction. In FIG. 21B, when T=2, of a LINK A (the transmitting and receiving link 6-1), a LINK B (the transmitting and receiving link 6-2), and a LINK C (the transmitting and receiving link 6-3) that form the link aggregation, a frame loss is generated in the LINK A.

The case shown in FIG. 21A in which T=1 will now be described. In the MEP 1M, TxFCf (t1)=100 is acquired. In the MIP 2M, TxFCf_mip2M (t1)=100 is acquired. In the MIP 3M, a transmission counter value is acquired for each link (i.e., 40 for LINK A, 40 for LINK B, and 20 for LINK C), and TxFCf_mip3M (a)=100 is acquired. In the MEP 4M, RxFCf (t1)=100 is acquired. The MEP 1M which is the transmission source stores values that are written in an LMR frame.

The case shown in FIG. 21B in which T=2 will now be described. In the MEP 1M, TxFCf (t2)=100+100=200 is acquired. In the MIP 2M, TxFCf_mip2M (t2)=100+100=200 is acquired. In the MIP 3M, a transmission counter value is acquired for each link (i.e., 40+20=60 for LINK A, 40+40=80 for LINK B, and 20+20=40 for LINK C), and TxFCf_mip3M (t2)=100+80=180 is acquired. In the MEP 4M, RxFCf (t2)=100+80=180 is acquired. The MEP 1M which is the transmission source stores values that are written in an LMR frame.

The MEP 1M which is the transmission source uses the following formula in order to calculate the End-to-End frame loss as well as the frame loss in each segment from the information stored in the LMR frame.

Loss (Far-end: End-to-End) = $|TxFCf(t2) - TxFCf(t1)| -$
$$|RxFCf(t2) - TxFCf(t1)|$$
$$= |200 - 100| - |180 - 100| = 20$$

Loss (Far-end: MEP1M − MIP2M) = $|TxFCf(t2) - TxFCf(t1)| -$
$$|TxFCf\_mip2M(t2) - TxFCf\_mip2M(t1)|$$
$$= |200 - 100| - |200 - 100| = 0$$

-continued $$\text{Loss (Far-end: } MIP2M - MIP3M) = |TxFCf\_mip2M(t2) - TxFCf\_mip2M(t1)| - |TxFCf\_mip3M(t2) - |TxFCf\_mip3M(t1)|$$
$$= |200 - 100| - |180 - 100| = 20$$

$$\text{Loss (Far-end: } MIP3M - MEP4M) = |TxFCf\_mip3M(t2) - TxFCf\_mip3M(t1)| - |RxFCf(t2) - RxFCf(t1)|$$
$$= |180 - 100| - |180 - 100| = 0$$

Note that it is also possible to record a program that achieves the functions of the processing sections of the present invention on a computer-readable recording medium, and to provide a communication service by causing a computer system to read and execute the program recorded on this recording medium. Note that the term in 'computer system' used here includes both OS and hardware such as peripheral devices and the like. Moreover, 'computer system' may also include a WWW system which is provided with a homepage providing environment (or display environment). Moreover, the term 'computer readable recording medium' also refers to portable media such as flexible disks, magneto-optical disks, ROM, and CD-ROM and the like, and storage devices such as hard disks that are built into a computer system. Furthermore, 'computer readable recording medium' also includes devices that hold a program for a fixed time such as the internal volatile memory (RAM) in a computer system which forms the server or client when the program is transmitted via a network such as the Internet or via a communication line such as a telephone line.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The communication system, the transmitting device, the receiving device, the data frame loss measuring method, the transmitting method, the receiving method, the data frame loss measuring program, the transmitting program, and the receiving program of the present invention can be applied between transmitting and receiving devices that have a plurality of transmitting and receiving links.

Either all of or a portion of the above described embodiments may also be described as in the following additions, however, they are not limited to these further exemplary embodiments.

(Further Exemplary Embodiment 1)

A communication system comprising:

a transmitting device that measures a number of data frames to be transmitted, and then allocates the data frames to be transmitted to a plurality of transmitting links, and then writes the total number of data frames to be transmitted in a data frame loss measurement frame, and then duplicates the written data frame loss measurement frame the same number of times as the number of the plurality of transmitting links, and then transmits sets which are made up of the allocated data frames and the duplicated data frame loss measurement frames to each of the plurality of transmitting links;

a receiving device that receives by means of a plurality of receiving links which correspond to each of the plurality of transmitting links the sets which are made up of the allocated data frames and the duplicated data frame loss measurement frames, and then measures the total number of received data frames, and then writes the total number of received data frames in at least one of the received data frame loss measurement frames; and a measuring device that acquires the data frame loss measurement frame in which the total number of data frames transmitted by the transmitting device and the total number of data frames received by the receiving device have been written, and then measures the data frame loss between the transmitting device and the receiving device by subtracting the total number of data frames received by the receiving device from the total number of data frames transmitted by the transmitting device.

(Further Exemplary Embodiment 2)

The communication system according to Further exemplary embodiment 1, wherein the transmitting device transmits the sets which are made up of the allocated data frames and the duplicated data frame loss measurement frames to each of the plurality of transmitting links in the sequence of the allocated data frames first and then the duplicated data frame loss measurement frames next, and the receiving device receives by means of each of the plurality of receiving links the sets which are made up of the allocated data frames and the duplicated data frame loss measurement frames in the sequence of the allocated data frames first and then the duplicated data frame loss measurement frames next.

(Further Exemplary Embodiment 3)

The communication system according to Further exemplary embodiment 1, wherein the transmitting device transmits the sets which are made up of the allocated data frames and the duplicated data frame loss measurement frames to each of the plurality of transmitting links in the sequence of the duplicated data frame loss measurement frames first and then the allocated data frames next, and the receiving device receives by means of each of the plurality of receiving links the sets which are made up of the allocated data frames and the duplicated data frame loss measurement frames in the sequence of the duplicated data frame loss measurement frames first and then the allocated data frames next.

(Further Exemplary Embodiment 4)

The communication system according to any of Further exemplary embodiments 1 through 3, wherein after the transmitting device has performed the data frame allocation and the data frame loss measurement frame duplication for a first set, it performs the data frame allocation and the data frame loss measurement frame duplication for a second set, and if the receiving device has already received the data frames contained in the second set by means of another receiving link before it receives the data frames contained in the first set by means of one receiving link, then it excludes the number of data frames contained in the second set which were received by means of the other receiving link from the total number of data frames contained in the first set which were received by means of the plurality of receiving links.

(Further Exemplary Embodiment 5)

The communication system according to Further exemplary embodiment 4, wherein the receiving device stores the data frames contained in the second set which were received by means of the other receiving link until the total number of data frames contained in the first set which were received by means of the plurality of receiving links has been measured.

(Further Exemplary Embodiment 6)

The communication system according to any of Further exemplary embodiments 1 through 5, wherein
there are further provided:
a transmitting-side communication device that transmits data frames to the transmitting device; and
a receiving-side communication device that receives data frames from the receiving device, and wherein
the transmitting-side communication device writes the number of data frames that are transmitted to the transmitting device in a data frame loss measurement frame that is transmitted to the transmitting device, and
the transmitting device writes the total number of data frames received from the transmitting-side communication device in a data frame loss measurement frame received from the transmitting-side communication device, and
the receiving device writes the total number of data frames transmitted to the receiving-side communication device in a data frame loss measurement frame received from the transmitting device, and
the receiving-side communication device writes the number of data frames received from the receiving device in a data frame loss measurement frame received from the receiving device, and wherein
the measuring device:
acquires the data frame loss measurement frame in which the number of data frames transmitted by the transmitting-side communication device and the total number of data frames received by the transmitting device have been written, and then measures the data frame loss between the transmitting-side communication device and the transmitting device by subtracting the total number of data frames received by the transmitting device from the number of data frames transmitted by the transmitting-side communication device; and
acquires the data frame loss measurement frame in which the total number of data frames transmitted by the receiving device and the number of data frames received by the receiving-side communication device have been written, and then measures the data frame loss between the receiving device and the receiving-side communication device by subtracting the number of data frames received by the receiving-side communication device from the total number of data frames transmitted by the receiving device.

(Further Exemplary Embodiment 7)

The communication system according to Further exemplary embodiment 6, wherein, of the duplicated data frame loss measurement frames received by the plurality of receiving links, the receiving device writes the total number of data frames received by the plurality of receiving links in a portion of the data frame loss measurement frames which is equal to the number of transmitting links to the receiving-side communication device, and discards the portion of the data frame loss measurement frames which exceeds the number of transmitting links to the receiving-side communication device.

(Further Exemplary Embodiment 8)

A transmitting device comprising:
a transmitted data frame number measuring section that measures the number of transmitted data frames;
a transmitted data frame allocating section that allocates the transmitted data frames to a plurality of transmitting links;
a data frame loss measurement frame writing section that writes the total number of transmitted data frames in a data frame loss measurement frame;
a data frame loss measurement frame duplicating section that duplicates the written data frame loss measurement frame the same number of times as the number of the plurality of transmitting links;
and a frame transmitting section that transmits sets which are made up of the allocated data frames and the duplicated data frame loss measurement frames to each of the plurality of transmitting links.

(Further Exemplary Embodiment 9)

The transmitting device according to Further exemplary embodiment 8, wherein the frame transmitting section transmits the sets which are made up of the allocated data frames and the duplicated data frame loss measurement frames to each of the plurality of transmitting links in the sequence of the allocated data frames first and then the duplicated data frame loss measurement frames next.

(Further Exemplary Embodiment 10)

The transmitting device according to Further exemplary embodiment 8, wherein the frame transmitting section transmits the sets which are made up of the allocated data frames and the duplicated data frame loss measurement frames to each of the plurality of transmitting links in the sequence of the duplicated data frame loss measurement frames first and then the allocated data frames next.

(Further Exemplary Embodiment 11)

The transmitting device according to any of Further exemplary embodiments 8 through 10, wherein, after the transmitted data frame allocating section and the data frame loss frame duplicating section have performed the data frame allocation and the data frame loss measurement frame duplication for a first et, they perform the data frame allocation and the data frame loss measurement frame duplication for a second set.

(Further Exemplary Embodiment 12)

The transmitting device according to any of Further exemplary embodiments 8 through 11, wherein the data frame loss measurement frame writing section writes the total number of data frames received in the transmitting device in a data frame loss measurement frame.

(Further Exemplary Embodiment 13)

A receiving device comprising:
a frame receiving section that receives sets which are made up of data frames which are allocated to a plurality of receiving links, and of data frame loss measurement frames which are duplicated the same number of times as the number of the plurality of receiving links by means of each one of the plurality of receiving links;
a received data frame number measuring section that measures the total number of received data frames; and
a data frame loss measurement frame writing section that writes the total number of the received data frames in at least one of the received data frame loss measurement frames.

(Further Exemplary Embodiment 14)

The receiving device according to Further exemplary embodiment 13 wherein
the frame receiving section receives by means of each of the plurality of receiving links the sets which are made up of the allocated data frames and the duplicated data frame loss measurement frames in the sequence of the allocated data frames first and then the duplicated data frame loss measurement frames next.

(Further Exemplary Embodiment 15)

The receiving device according to Further exemplary embodiment 13, wherein the frame receiving section receives by means of each of the plurality of receiving links the sets which are made up of the allocated data frames and the duplicated data frame loss measurement frames in the sequence of the duplicated data frame loss measurement frames first and then the allocated data frames next.

(Further Exemplary Embodiment 16)

The receiving device according to any of Further exemplary embodiments 13 through 15, wherein, if, prior to the frame receiving section receiving by means of one receiving link the data frames contained in a first set in which the data frames were allocated first and the data frame loss measurement frames were duplicated first, it receives by means of another receiving link the data frames contained in a second set in which the data frames were allocated subsequently and the data frame loss measurement frames were duplicated subsequently, the received data frame number measuring section excludes the number of data frames contained in the second set which were received by means of the other receiving link from the total number of data frames contained in the first set which were received by means of the plurality of receiving links.

(Further Exemplary Embodiment 17)

The receiving device according to Further exemplary embodiment 16, wherein there is further provided a data frame storage section that stores the data frames contained in the second set which were received by means of the other receiving link until the total number of data frames contained in the first set which were received by means of the plurality of receiving links has been measured.

(Further Exemplary Embodiment 18)

The transmitting device according to any of Further exemplary embodiments 13 through 17, wherein the data frame loss measurement frame writing section writes the total number of data frames transmitted in the receiving device in a data frame loss measurement frame.

(Further Exemplary Embodiment 19)

The receiving device according to Further exemplary embodiment 18, wherein, of the duplicated data frame loss measurement frames received by the plurality of receiving links, the data frame loss measurement frame writing section writes the total number of data frames received by the plurality of receiving links in a portion of the data frame loss measurement frames which is equal to the number of transmitting links, and discards the portion of the data frame loss measurement frames which exceeds the number of the transmitting links.

(Further Exemplary Embodiment 20)

A measuring device comprising:

a data frame loss measurement frame acquiring section that acquires data frame loss measurement frames in which is written the total number of data frames that are transmitted by a transmitting device that firstly measures the number of data frames to be transmitted, and then allocates the data frames to be transmitted to a plurality of transmitting links, and then writes the total number of data frames to be transmitted in a data frame loss measurement frame, and then duplicates the written data frame loss measurement frame the same number of times as the number of the plurality of transmitting links, and then transmits sets which are made up of the allocated data frames and the duplicated data frame loss measurement frames to each of the plurality of transmitting links, and in which is also written the total number of data frames received by a receiving device that receives by means of a plurality of receiving links which correspond to each of the plurality of transmitting links the sets which are made up of the allocated data frames and the duplicated data frame loss measurement frames, and then measures the total number of received data frames, and then writes the total number of received data frames in at least one of the received data frame loss measurement frames; and a data frame loss measuring section that measures the data frame loss between the transmitting device and the receiving device by subtracting the total number of data frames received by the receiving device from the total number of data frames transmitted by the transmitting device.

(Further Exemplary Embodiment 21)

The measuring device according to Further exemplary embodiment 20, wherein the data frame loss measurement frame acquiring section acquires data frame loss measurement frames in which are written the number of data frames transmitted by a transmitting-side communication device which transmits data frames to the transmitting device and also the total number of data frames received by the transmitting device, and also acquires data frame loss measurement frames in which are written the number of data frames received by a receiving-side communication device which receives data frames from the receiving device and also the total number of data frames transmitted by the receiving device, and wherein the measuring section measures the data frame loss between the transmitting-side communication device and the transmitting device by subtracting the total number of data frames received by the transmitting device from the number of data frames transmitted by the transmitting-side communication device, and also measures the data frame loss between the receiving device and the receiving-side communication device by subtracting the number of data frames received by the receiving-side communication device from the total number of data frames transmitted by the receiving device.

(Further Exemplary Embodiment 22)

A data frame loss measuring method in which there are performed in the following sequence:

a transmitting step in which a number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links;

a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a measuring step in which the data frame loss measurement frame in which the total number of transmitted data frames and the total number of received data frames have been written is acquired, and the data frame loss between the transmission and the reception is then measured by subtracting the total number of received data frames from the total number of transmitted data frames.

(Further Exemplary Embodiment 23)

The data frame loss measuring method according to Further exemplary embodiment 22, wherein, in the transmitting step, the sets which are made up of the allocated data frames and the duplicated data frame loss measurement frames are transmitted to each of the plurality of transmitting links in the sequence of the allocated data frames first and then the duplicated data frame loss measurement frames next, and, in the receiving step, the sets which are made up of the allocated data frames and the duplicated data frame loss measurement frames are received by means of each of the plurality of receiving links in the sequence of the allocated data frames first and then the duplicated data frame loss measurement frames next.

(Further Exemplary Embodiment 24)

The data frame loss measuring method according to Further exemplary embodiment 22, wherein, in the transmitting step, the sets which are made up of the allocated data frames and the duplicated data frame loss measurement frames are transmitted to each of the plurality of transmitting links in the sequence of the duplicated data frame loss measurement frames first and then the allocated data frames next, and, in the receiving step, the sets which are made up of the allocated data frames and the duplicated data frame loss measurement frames are received by means of each of the plurality of receiving links in the sequence of the duplicated data frame loss measurement frames first and then the allocated data frames next.

(Further Exemplary Embodiment 25)

The data frame loss measuring method according to any of Further exemplary embodiments 22 through 24, wherein, in the transmitting step, after the data frame allocation and the data frame loss measurement frame duplication have been performed for a first set, the data frame allocation and the data frame loss measurement frame duplication are performed for a second set, and, in the receiving step, if, before the data frames contained in the first set are received by means of one receiving link, the data frames contained in the second set have already been received by means of another receiving link, then the number of data frames contained in the second set which were received by means of the other receiving link are excluded from the total number of data frames contained in the first set which were received by means of the plurality of receiving links.

(Further Exemplary Embodiment 26)

The data frame loss measuring method according to Further exemplary embodiment 25, wherein, in the receiving step, the data frames contained in the second set which were received by means of the other receiving link are stored until the total number of data frames contained in the first set which were received by means of the plurality of receiving links has been measured.

(Further Exemplary Embodiment 27)

The data frame loss measuring method according to any of Further exemplary embodiments 22 through 26, wherein, the transmitting step is executed by the transmitting device, and the receiving step is executed by the receiving device, and wherein, prior to the transmitting step there is further provided a transmitted frame writing step in which a transmitting-side communication device that transmits data frames to the transmitting device writes the number of data frames that are transmitted to the transmitting device in a data frame loss measurement frame that is transmitted to the transmitting device, and in the transmitting step, the transmitting device writes the total number of data frames received from the transmitting-side communication device in a data frame loss measurement frame received from the transmitting-side communication device, and in the receiving step, the receiving device writes the total number of data frames that are transmitted to a receiving-side communication device which receives data frames from the receiving device in a data frame loss measurement frame received from the transmitting device, and wherein, after the receiving step and also prior to the measuring step there is further provided a received frame writing step in which the receiving-side communication device writes the number of data frames received from the receiving device in a data frame loss measurement frame received from the receiving device, and in the measuring step, the data frame loss measurement frame in which the number of data frames transmitted by the transmitting-side communication device and the total number of data frames received by the transmitting device have been written is acquired, and the data frame loss between the transmitting-side communication device and the transmitting device is then measured by subtracting the total number of data frames received by the transmitting device from the number of data frames transmitted by the transmitting-side communication device; and the data frame loss measurement frame in which the total number of data frames transmitted by the receiving device and the number of data frames received by the receiving-side communication device have been written is acquired, and the data frame loss between the receiving device and the receiving-side communication device is then measured by subtracting the number of data frames received by the receiving-side communication device from the total number of data frames transmitted by the receiving device.

(Further Exemplary Embodiment 28)

The data frame loss measuring method according to Further exemplary embodiment 27, wherein, in the receiving step, of the duplicated data frame loss measurement frames received by the plurality of receiving links, the receiving device writes the total number of data frames received by the plurality of receiving links in a portion of the data frame loss measurement frames which is equal to the number of transmitting links to the receiving-side communication device, and discards the portion of the data frame loss measurement frames which exceeds the number of transmitting links to the receiving-side communication device.

(Further Exemplary Embodiment 29)

A transmitting method in which there are performed in the following sequence:

a transmitted data frame number measuring step in which the number of transmitted data frames is measured;

a data frame loss measurement frame writing step in which the total number of transmitted data frames is written in a data frame loss measurement frame;

a data frame loss measurement frame duplicating step in which the written data frame loss measurement frame is duplicated the same number of times as the number of the plurality of transmitting links;

and a frame transmitting step in which sets which are made up of the allocated data frames and the duplicated data frame loss measurement frames are transmitted to each of the plurality of transmitting links.

(Further Exemplary Embodiment 30)

The transmitting method according to Further exemplary embodiment 29, wherein, in the frame transmitting step, the sets which are made up of the allocated data frames and the duplicated data frame loss measurement frames are transmitted to each of the plurality of transmitting links in the sequence of the allocated data frames first and then the duplicated data frame loss measurement frames next.

(Further Exemplary Embodiment 31)

The transmitting method according to Further exemplary embodiment 29, wherein, in the frame transmitting step, the sets which are made up of the allocated data frames and the duplicated data frame loss measurement frames are transmitted to each of the plurality of transmitting links in the sequence of the duplicated data frame loss measurement frames first and then the allocated data frames next.

(Further Exemplary Embodiment 32)

The transmitting method according to any of Further exemplary embodiments 29 through 31, wherein, in the data frame loss measurement frame duplicating step, after the data frame allocation and the data frame loss measurement frame duplication have been performed for a first set, the data frame allocation and the data frame loss measurement frame duplication are performed for a second set.

(Further Exemplary Embodiment 33)

The transmitting device according to any of Further exemplary embodiments 29 through 32, wherein, in the data frame loss measurement frame writing step, the total number of received data frames is written in a data frame loss measurement frame.

(Further Exemplary Embodiment 34)

A receiving method in which there are performed in the following sequence:

a frame receiving step in which sets which are made up of data frames which are allocated to a plurality of receiving links, and of data frame loss measurement frames which are duplicated the same number of times as the number of the plurality of receiving links are received by each one of the plurality of receiving links;

a received data frame number measuring step in which the total number of the received data frames is measured; and a data frame loss measurement frame writing step in which the total number of the received data frames is written in at least one of the received data frame loss measurement frames.

(Further Exemplary Embodiment 35)

The receiving method according to Further exemplary embodiment 34 wherein, in the frame receiving step, the sets which are made up of the allocated data frames and the duplicated data frame loss measurement frames are received by each of the plurality of receiving links in the sequence of the allocated data frames first and then the duplicated data frame loss measurement frames next.

(Further Exemplary Embodiment 36)

The receiving device according to Further exemplary embodiment 34, wherein, in the frame receiving step, the sets which are made up of the allocated data frames and the duplicated data frame loss measurement frames are received by each of the plurality of receiving links in the sequence of the duplicated data frame loss measurement frames first and then the allocated data frames next.

(Further Exemplary Embodiment 37)

The receiving method according to any of Further exemplary embodiments 34 through 36, wherein, in the frame receiving step, if, prior to the data frames contained in a first set in which the data frames were allocated first and the data frame loss measurement frames were duplicated first being received by means of one receiving link, the data frames contained in a second set in which the data frames were allocated subsequently and the data frame loss measurement frames were duplicated subsequently are received by means of another receiving link, then in the received data frame number measuring step, the number of data frames contained in the second set which were received by means of the other receiving link are excluded from the total number of data frames contained in the first set which were received by means of the plurality of receiving links.

(Further Exemplary Embodiment 38)

The receiving method according to Further exemplary embodiment 37, wherein, in the received data frame number measuring step, the data frames contained in the second set which were received by means of the other receiving link are stored until the total number of data frames contained in the first set which were received by means of the plurality of receiving links has been measured.

(Further Exemplary Embodiment 39)

The receiving method according to any of Further exemplary embodiments 34 through 38, wherein, in the data frame loss measurement frame writing step, the total number of transmitted data frames is written in a data frame loss measurement frame.

(Further Exemplary Embodiment 40)

The receiving method according to Further exemplary embodiment 39, wherein, in the data frame loss measurement frame writing step, of the duplicated data frame loss measurement frames received by the plurality of receiving links, the total number of data frames received by the plurality of receiving links is written in a portion of these data frame loss measurement frames which is equal to the number of transmitting links, and the portion of the data frame loss measurement frames which exceeds the number of the transmitting links is discarded.

(Further Exemplary Embodiment 41)

A measuring method comprising in the following sequence:

a data frame loss measurement frame acquiring step in which are acquired data frame loss measurement frames in which is written the total number of data frames that are transmitted in a transmitting step in which the number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links, and in which is also written the total number of data frames received in a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a data frame loss measuring step in which the data frame loss between the transmitting device and the receiving device is measured by subtracting the total number of data frames received by the receiving device from the total number of data frames transmitted by the transmitting device.

(Further Exemplary Embodiment 42)

The measuring method according to Further exemplary embodiment 41, wherein, the transmitting step is executed by the transmitting device, and the receiving step is executed by the receiving device, and wherein, in the data frame loss measurement frame acquiring step, data frame loss measurement frames in which the number of data frames transmitted by the transmitting-side communication device which transmits data frames to the transmitting device, and the total number of data frames received by the transmitting device have been written are acquired, and also data frame loss measurement frames in which the number of data frames received by the receiving-side communication device which receives data frames from the receiving device, and the total number of data frames transmitted by the receiving device have been written are acquired, and in the data frame loss measuring step, the data frame loss between the transmitting-side communication device and the transmitting device is measured by subtracting the total number of data frames received by the transmitting device from the number of data frames transmitted by the transmitting-side communication device, and also the data frame loss between the receiving device and the receiving-side communication device is measured by subtracting the number of data frames received by the receiving-side communication device from the total number of data frames transmitted by the receiving device.

(Further Exemplary Embodiment 43)

A data frame loss measuring program which causes a communication system to execute in the following sequence:

a transmitting step in which a number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links;

a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a measuring step in which a data frame loss measurement frame in which the total number of transmitted data frames and the total number of received data frames have been written is acquired, and the data frame loss between the transmission and the reception is then measured by subtracting the total number of received data frames from the total number of transmitted data frames.

(Further Exemplary Embodiment 44)

The data frame loss measuring program according to Further exemplary embodiment 43, wherein, in the transmitting step, the sets which are made up of the allocated data frames and the duplicated data frame loss measurement frames are transmitted to each of the plurality of transmitting links in the sequence of the allocated data frames first and then the duplicated data frame loss measurement frames next, and, in the receiving step, the sets which are made up of the allocated data frames and the duplicated data frame loss measurement frames are received by means of each of the plurality of receiving links in the sequence of the allocated data frames first and then the duplicated data frame loss measurement frames next.

(Further Exemplary Embodiment 45)

The data frame loss measuring program according to Further exemplary embodiment 43, wherein, in the transmitting step, the sets which are made up of the allocated data frames and the duplicated data frame loss measurement frames are transmitted to each of the plurality of transmitting links in the sequence of the duplicated data frame loss measurement frames first and then the allocated data frames next, and, in the receiving step, the sets which are made up of the allocated data frames and the duplicated data frame loss measurement frames are received by means of each of the plurality of receiving links in the sequence of the duplicated data frame loss measurement frames first and then the allocated data frames next.

(Further Exemplary Embodiment 46)

The data frame loss measuring program according to any of Further exemplary embodiments 43 through 45, wherein, in the transmitting step, after the data frame allocation and the data frame loss measurement frame duplication have been performed for a first set, the data frame allocation and the data frame loss measurement frame duplication are performed for a second set, and, in the receiving step, if, before the data frames contained in the first set are received by means of one receiving link, the data frames contained in the second set have already been received by means of another receiving link, then the number of data frames contained in the second set which were received by means of the other receiving link are excluded from the total number of data frames contained in the first set which were received by means of the plurality of receiving links.

(Further Exemplary Embodiment 47)

The data frame loss measuring program according to Further exemplary embodiment 46, wherein, in the receiving step, the data frames contained in the second set which were received by means of the other receiving link are stored until the total number of data frames contained in the first set which were received by means of the plurality of receiving links has been measured.

(Further Exemplary Embodiment 48)

The data frame loss measuring program according to any of Further exemplary embodiments 43 through 47, wherein, the transmitting step is executed by the transmitting device, and the receiving step is executed by the receiving device, and wherein, prior to the transmitting step, the data frame loss measuring program further causes the communication system to execute a transmitted frame writing step in which a transmitting-side communication device that transmits data frames to the transmitting device writes the number of data frames that are transmitted to the transmitting device in a data frame loss measurement frame that is transmitted to the transmitting device is further executed, and in the transmitting step, the transmitting device writes the total number of data frames received from the transmitting-side communication device in a data frame loss measurement frame received from the transmitting-side communication device, and in the receiving step, the receiving device writes the total number of data frames that are transmitted to a receiving-side communication device which receives data frames from the receiving device in a data frame loss measurement frame received from the transmitting device, and wherein, after the receiving step and also prior to the measuring step the data frame loss measuring program further causes the communication system to execute a received frame writing step in which the receiving-side communication device writes the number of data frames received from the receiving device in a data frame loss measurement frame received from the receiving device, and in the measuring step, the data frame loss measurement frame in which the number of data frames transmitted by the transmitting-side communication device and the total number of data frames received by the transmitting device have been written is acquired, and the data frame loss between the transmitting-side communication device and the transmitting device is then measured by subtracting the total number of data frames received by the transmitting device from the number of data frames transmitted by the transmitting-side communication device; and the data frame loss measurement frame in which the total number of data frames transmitted by the receiving device and the number of data frames received by the receiving-side communication device have been written is acquired, and the data frame loss between the receiving device and the receiving-side communication device is then measured by subtracting the number of data frames received by the receiving-side communication device from the total number of data frames transmitted by the receiving device.

(Further Exemplary Embodiment 49)

The data frame loss measuring program according to Further exemplary embodiment 48, wherein, in the receiving step, of the duplicated data frame loss measurement frames received by the plurality of receiving links, the receiving device writes the total number of data frames received by the plurality of receiving links in a portion of the data frame loss measurement frames which is equal to the number of transmitting links to the receiving-side communication device, and discards the portion of the data frame loss measurement frames which exceeds the number of transmitting links to the receiving-side communication device.

(Further Exemplary Embodiment 50)

A transmitting program which causes a transmitting device to execute in the following sequence:

a transmitted data frame number measuring step in which the number of transmitted data frames is measured;

a data frame loss measurement frame writing step in which the total number of transmitted data frames is written in a data frame loss measurement frame;

a data frame loss measurement frame duplicating step in which the written data frame loss measurement frame is duplicated the same number of times as the number of the plurality of transmitting links;

and a frame transmitting step in which sets which are made up of the allocated data frames and the duplicated data frame loss measurement frames are transmitted to each of the plurality of transmitting links.

(Further Exemplary Embodiment 51)

The transmitting program according to Further exemplary embodiment 50, wherein, in the frame transmitting step, the sets which are made up of the allocated data frames and the duplicated data frame loss measurement frames are transmitted to each of the plurality of transmitting links in the sequence of the allocated data frames first and then the duplicated data frame loss measurement frames next.

(Further Exemplary Embodiment 52)

The transmitting program according to Further exemplary embodiment 50, wherein, in the frame transmitting step, the sets which are made up of the allocated data frames and the duplicated data frame loss measurement frames are transmitted to each of the plurality of transmitting links in the sequence of the duplicated data frame loss measurement frames first and then the allocated data frames next.

(Further Exemplary Embodiment 53)

The transmitting program according to any of Further exemplary embodiments 50 through 52, wherein, in the data frame loss measurement frame duplicating step, after the data frame allocation and the data frame loss measurement frame duplication have been performed for a first set, the data frame allocation and the data frame loss measurement frame duplication are performed for a second set.

(Further Exemplary Embodiment 54)

The transmitting program according to any of Further exemplary embodiments 50 through 53, wherein, in the data frame loss measurement frame writing step, the total number of received data frames is written in a data frame loss measurement frame.

(Further Exemplary Embodiment 55)

A receiving program which causes a receiving device to execute in the following sequence:

a frame receiving step in which sets which are made up of data frames which are allocated to a plurality of receiving links, and of data frame loss measurement frames which are duplicated the same number of times as the number of the plurality of receiving links are received by each one of the plurality of receiving links;

a received data frame number measuring step in which the total number of the received data frames is measured; and a data frame loss measurement frame writing step in which the total number of the received data frames is written in at least one of the received data frame loss measurement frames.

(Further Exemplary Embodiment 56)

The receiving program according to Further exemplary embodiment 55 wherein, in the frame receiving step, the sets which are made up of the allocated data frames and the duplicated data frame loss measurement frames are received by each of the plurality of receiving links in the sequence of the allocated data frames first and then the duplicated data frame loss measurement frames next.

(Further Exemplary Embodiment 57)

The receiving program according to Further exemplary embodiment 55, wherein, in the frame receiving step, the sets which are made up of the allocated data frames and the duplicated data frame loss measurement frames are received by each of the plurality of receiving links in the sequence of the duplicated data frame loss measurement frames first and then the allocated data frames next.

(Further Exemplary Embodiment 58)

The receiving program according to any of Further exemplary embodiments 55 through 57, wherein, in the frame receiving step, if, prior to the data frames contained in a first set in which the data frames were allocated first and the data frame loss measurement frames were duplicated first being received by means of one receiving link, the data frames contained in a second set in which the data frames were allocated subsequently and the data frame loss measurement frames were duplicated subsequently are received by means of another receiving link, then in the received data frame number measuring step, the number of data frames contained in the second set which were received by means of the other receiving link are excluded from the total number of data frames contained in the first set which were received by means of the plurality of receiving links.

(Further Exemplary Embodiment 59)

The receiving program according to Further exemplary embodiment 58, wherein, in the received data frame number measuring step, the data frames contained in the second set which were received by means of the other receiving link are stored until the total number of data frames contained in the first set which were received by means of the plurality of receiving links has been measured.

(Further Exemplary Embodiment 60)

The receiving method according to any of Further exemplary embodiments 55 through 59, wherein, in the data frame loss measurement frame writing step, the total number of transmitted data frames is written in a data frame loss measurement frame.

(Further Exemplary Embodiment 61)

The receiving program according to Further exemplary embodiment 60, wherein, in the data frame loss measurement frame writing step, of the duplicated data frame loss measurement frames received by the plurality of receiving links, the total number of data frames received by the plurality of receiving links is written in a portion of these data frame loss measurement frames which is equal to the number of transmitting links, and the portion of the data frame loss measurement frames which exceeds the number of the transmitting links is discarded.

(Further Exemplary Embodiment 62)

A measuring program which causes a measuring device to execute in the following sequence:

a data frame loss measurement frame acquiring step in which are acquired data frame loss measurement frames in which is written the total number of data frames that are transmitted in a transmitting step in which the number of data frames to be transmitted is measured, and the data frames to be transmitted are then allocated to a plurality of transmitting links, and the total number of data frames to be transmitted is then written in a data frame loss measurement frame, and the written data frame loss measurement frame is then duplicated the same number of times as the number of the plurality of transmitting links, and sets which are made up of the allocated data frames and the duplicated data frame loss measurement frames are then transmitted to each of the plurality of transmitting links, and in which data frame loss measurement frames is also written the total number of data frames received in a receiving step in which the sets which are made up of the allocated data frames and the duplicated data frame loss measurement frames are received by means of a plurality of receiving links which correspond to each of the plurality of transmitting links, and the total number of received data frames is then measured, and the total number of received data frames is then written in at least one of the received data frame loss measurement frames; and a data frame loss measuring step in which the data frame loss between the transmitting device and the receiving device is measured by subtracting the total number of data frames received by the receiving device from the total number of data frames transmitted by the transmitting device.

(Further Exemplary Embodiment 63)

The measuring program according to Further exemplary embodiment 62, wherein, the transmitting step is executed by the transmitting device, and the receiving step is executed by the receiving device, and wherein, in the data frame loss measurement frame acquiring step, data frame loss measurement frames in which the number of data frames transmitted by the transmitting-side communication device which transmits data frames to the transmitting device, and the total number of data frames received by the transmitting device have been written are acquired, and also data frame loss measurement frames in which the number of data frames received by the receiving-side communication device which receives data frames from the receiving device, and the total number of data frames transmitted by the receiving device have been written are acquired, and in the data frame loss measuring step, the data frame loss between the transmitting-side communication device and the transmitting device is measured by subtracting the total number of data frames received by the transmitting device from the number of data frames transmitted by the transmitting-side communication device, and also the data frame loss between the receiving device and the receiving-side communication device is measured by subtracting the number of data frames received by the receiving-side communication device from the total number of data frames transmitted by the receiving device.

What is claimed is:

1. A communication system, comprising:
   a transmitting device that measures a number of data frames to be transmitted, and then allocates the data frames to be transmitted to a plurality of transmitting links, and then writes a total number of data frames to be transmitted in a data frame loss measurement frame, and then duplicates the written data frame loss measurement frame a same number of times as a number of the plurality of transmitting links to provide duplicated data frame loss measurement frames, and then transmits sets which are made up of the data frames which are allocated and the duplicated data frame loss measurement frames to each of the plurality of transmitting links;
   a receiving device that receives by a plurality of receiving links which correspond to each of the plurality of transmitting links the sets which are made up of the data frames which are allocated and the duplicated data frame loss measurement frames, and then measures a total number of received data frames, and then writes a total number of received data frames in at least one of the received data frame loss measurement frames; and
   a measuring device that acquires the at least one data frame loss measurement frame in which the total number of data frames transmitted by the transmitting device and the total number of data frames received by the receiving device have been written, and then measures a data frame loss between the transmitting device and the receiving device by subtracting the total number of data frames received by the receiving device from the total number of data frames transmitted by the transmitting device.

2. The communication system according to claim 1, wherein
   the transmitting device transmits the sets which are made up of the data frames which are allocated and the duplicated data frame loss measurement frames to each of the plurality of transmitting links in a sequence of the data frames which are allocated first and then the duplicated data frame loss measurement frames next, and
   the receiving device receives by each of the plurality of receiving links the sets which are made up of the data frames which are allocated and the duplicated data frame loss measurement frames in the sequence of the data frames which are allocated first and then the duplicated data frame loss measurement frames next.

3. The communication system according to claim 1, wherein the transmitting device transmits the sets which are made up of the data frames which are allocated and the duplicated data frame loss measurement frames to each of the plurality of transmitting links in a sequence of the duplicated data frame loss measurement frames first and then the data frames which are allocated next, and
the receiving device receives by each of the plurality of receiving links the sets which are made up of the data frames which are allocated and the duplicated data frame loss measurement frames in the sequence of the duplicated data frame loss measurement frames first and then the data frames which are allocated next.

4. The communication system according to claim 1, wherein
after the transmitting device has performed the data frame allocation and the data frame loss measurement frame duplication for a first set, the transmitting device performs the data frame allocation and the data frame loss measurement frame duplication for a second set, and
if the receiving device has already received the data frames contained in the second set by another receiving link before the receiving device receives the data frames contained in the first set by one receiving link, then the receiving device excludes the number of data frames contained in the second set which were received by the another receiving link from a total number of data frames contained in the first set which were received by the plurality of receiving links.

5. The communication system according to claim 4, wherein the receiving device stores the data frames contained in the second set which were received by the another receiving link until the total number of data frames contained in the first set which were received by the plurality of receiving links has been measured.

6. The communication system according to claim 1, further comprising:
a transmitting-side communication device that transmits data frames to the transmitting device; and
a receiving-side communication device that receives data frames from the receiving device, wherein
the transmitting-side communication device writes a number of data frames that are transmitted to the transmitting device in a data frame loss measurement frame that is transmitted to the transmitting device,
the transmitting device writes a total number of data frames received from the transmitting-side communication device in a data frame loss measurement frame received from the transmitting-side communication device,
the receiving device writes a total number of data frames transmitted to the receiving-side communication device in a data frame loss measurement frame received from the transmitting device, and
the receiving-side communication device writes a number of data frames received from the receiving device in a data frame loss measurement frame received from the receiving device, and
wherein the measuring device:
acquires the data frame loss measurement frame in which the number of data frames transmitted by the transmitting-side communication device and the total number of data frames received by the transmitting device have been written, and then measures the data frame loss between the transmitting-side communication device and the transmitting device by subtracting the total number of data frames received by the transmitting device from the number of data frames transmitted by the transmitting-side communication device; and
acquires the data frame loss measurement frame in which the total number of data frames transmitted by the receiving device and the number of data frames received by the receiving-side communication device have been written, and then measures the data frame loss between the receiving device and the receiving-side communication device by subtracting the number of data frames received by the receiving-side communication device from the total number of data frames transmitted by the receiving device.

7. The communication system according to claim 6, wherein, out of the duplicated data frame loss measurement frames received by the plurality of receiving links, the receiving device writes the total number of data frames received by the plurality of receiving links in a portion of the data frame loss measurement frames which is equal to the number of transmitting links to the receiving-side communication device, and discards a portion of the data frame loss measurement frames which exceeds the number of transmitting links to the receiving-side communication device.

8. A transmitting device comprising:
a processor coupled to a memory storing instructions for causing the transmitting device to execute:
a transmitted data frame number measuring section that is configured to measure a number of transmitted data frames;
a transmitted data frame allocating section that is configured to allocate the transmitted data frames to a plurality of transmitting links;
a data frame loss measurement frame writing section that is configured to write a total number of transmitted data frames in a data frame loss measurement frame;
a data frame loss measurement frame duplicating section that is configured to duplicate a written data frame loss measurement frame a same number of times as a number of the plurality of transmitting links to provide duplicated data frame loss measurement frames; and
a frame transmitting section that is configured to transmit sets which are made up of the transmitted data frames which are allocated and the duplicated data frame loss measurement frames to each of the plurality of transmitting links.

9. The transmitting device according to claim 8, wherein the frame transmitting section is configured to transmit the sets which are made up of the transmitted data frames which are allocated and the duplicated data frame loss measurement frames to each of the plurality of transmitting links in a sequence of the transmitted data frames which are allocated first and then the duplicated data frame loss measurement frames next.

10. The transmitting device according to claim 8, wherein the frame transmitting section is configured to transmit the sets which are made up of the transmitted data frames which are allocated and one of the duplicated data frame loss measurement frames to each of the plurality of transmitting links in the sequence of the duplicated data frame loss measurement frames first and then the transmitted data frames which are allocated next.

11. The transmitting device according to claim 8, wherein, after the transmitted data frame allocating section that is configured to transmit data frames and the data frame loss frame duplicating section have performed the data frame allocation and the data frame loss measurement frame duplication for a first set, the transmitted data frame allocating section and the data frame loss frame duplicating section perform the data frame allocation and the data frame loss measurement frame duplication for a second set.

12. The transmitting device according to claim 8, wherein the data frame loss measurement frame writing section is configured to write a total number of data frames received in the transmitting device in a data frame loss measurement frame.

13. A receiving device, comprising:
  a processor coupled to a memory storing instructions for causing the receiving device to execute:
  a frame receiving section that receives sets which are made up of data frames which are allocated to a plurality of receiving links, and of data frame loss measurement frames which are duplicated a same number of times as a number of a plurality of receiving links by each one of the plurality of receiving links to provide duplicated data frame loss measurement frames;
  a received data frame number measuring section that measures a total number of received data frames; and
  a data frame loss measurement frame writing section that writes the total number of the received data frames in at least one of the received data frame loss measurement frames,
  wherein the frame receiving section that is configured to receive by each of the plurality of receiving links the sets which are made up of the data frames which are allocated and the duplicated data frame loss measurement frames in the sequence of the transmitted data frames which are allocated first and then the duplicated data frame loss measurement frames next.

14. A receiving device, comprising:
  a processor coupled to a memory storing instructions for causing the receiving device to execute:
  a frame receiving section that receives sets which are made up of data frames which are allocated to a plurality of receiving links, and of data frame loss measurement frames which are duplicated a same number of times as a number of the plurality of receiving links by each one of the plurality of receiving links to provide duplicated data frame loss measurement frames;
  a received data frame number measuring section that measures a total number of received data frames; and
  a data frame loss measurement frame writing section that writes a total number of the received data frames in at least one of the received data frame loss measurement frames, wherein the frame receiving section is configured to receive by each of the plurality of receiving links the sets which are made up of the data frames which are allocated and the duplicated data frame loss measurement frames in a sequence of the duplicated data frame loss measurement frames first and then the transmitted data frames which are allocated next.

15. A receiving device, comprising:
  a processor coupled to a memory storing instructions for causing the receiving device to execute:
  a frame receiving section that receives sets which are made up of data frames which are allocated to a plurality of receiving links, and of data frame loss measurement frames which are duplicated a same number of times as a number of the plurality of receiving links by each one of the plurality of receiving links;
  a received data frame number measuring section that measures a total number of received data frames; and
  a data frame loss measurement frame writing section that writes the total number of the received data frames in at least one of the received data frame loss measurement frames,
  wherein, if, prior to the frame receiving section configured to receive by one receiving link the data frames contained in a first set in which the data frames were allocated first and the data frame loss measurement frames were duplicated first, the frame receiving section receives by another receiving link the data frames contained in a second set in which the data frames were allocated subsequently and the data frame loss measurement frames were duplicated subsequently, and
  wherein the received data frame number measuring section is configured to exclude a number of data frames contained in the second set which were received by the other receiving link from the total number of data frames contained in the first set which were received by the plurality of receiving links.

16. The receiving device according to claim 15, wherein there is further provided a data frame storage section that is configured to store the data frames contained in the second set which were received by the other receiving link until the total number of data frames contained in the first set which were received by the plurality of receiving links has been measured.

17. A receiving device, comprising:
  a processor coupled to a memory storing instructions for causing the receiving device to execute:
  a frame receiving section that receives sets which are made up of data frames which are allocated to a plurality of receiving links, and of data frame loss measurement frames which are duplicated a same number of times as a number of the plurality of receiving links by each one of the plurality of receiving links to provide duplicated data frame loss measurement frames;
  a received data frame number measuring section that measures a total number of received data frames; and
  a data frame loss measurement frame writing section that writes the total number of the received data frames in at least one of the received data frame loss measurement frames,
  wherein the data frame loss measurement frame writing section is configured to write a total number of data frames transmitted in the receiving device in a data frame loss measurement frame, and wherein, of the duplicated data frame loss measurement frames received by the plurality of receiving links, the data frame loss measurement frame writing section is configured to write a total number of data frames received by the plurality of receiving links in a portion of the data frame loss measurement frames which is equal to a number of transmitting links, and configured to discard the portion of the data frame loss measurement frames which exceeds the number of the transmitting links.

* * * * *